Figure 16:
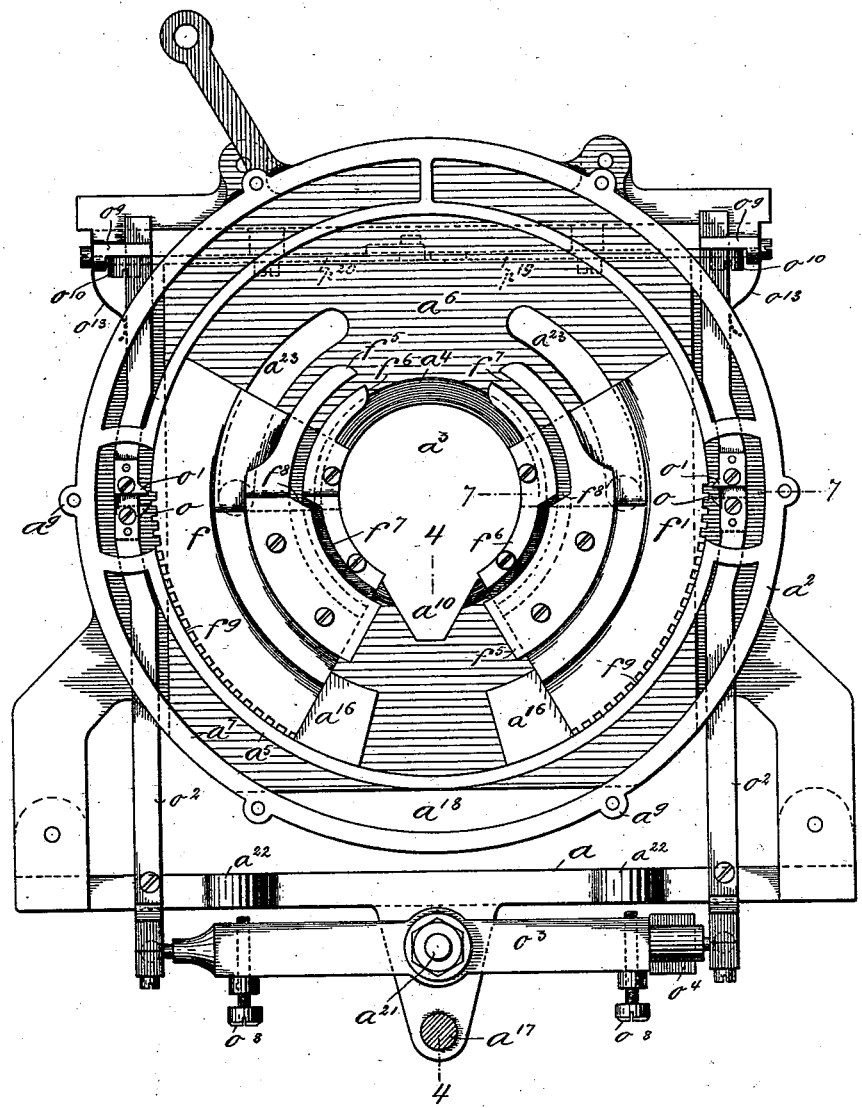

(No Model.) 12 Sheets—Sheet 1.
E. J. FRANCK.
CIRCULAR KNITTING MACHINE.
No. 508,512. Patented Nov. 14, 1893.
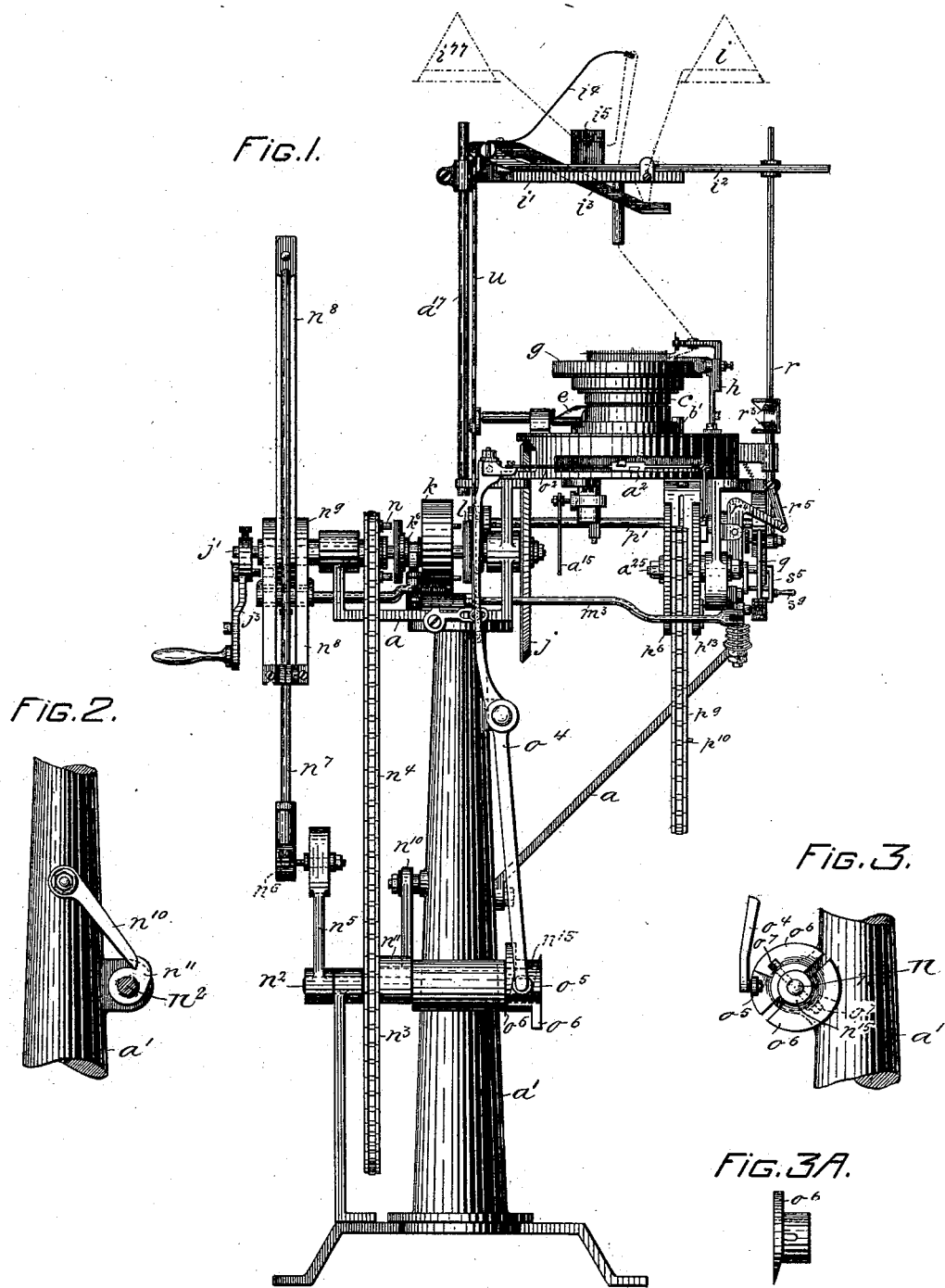
WITNESSES:
John W. Achard
W. A. Schaefer
INVENTOR.
Emil J. Franck.
By J. Walter Douglass.
ATT'Y.

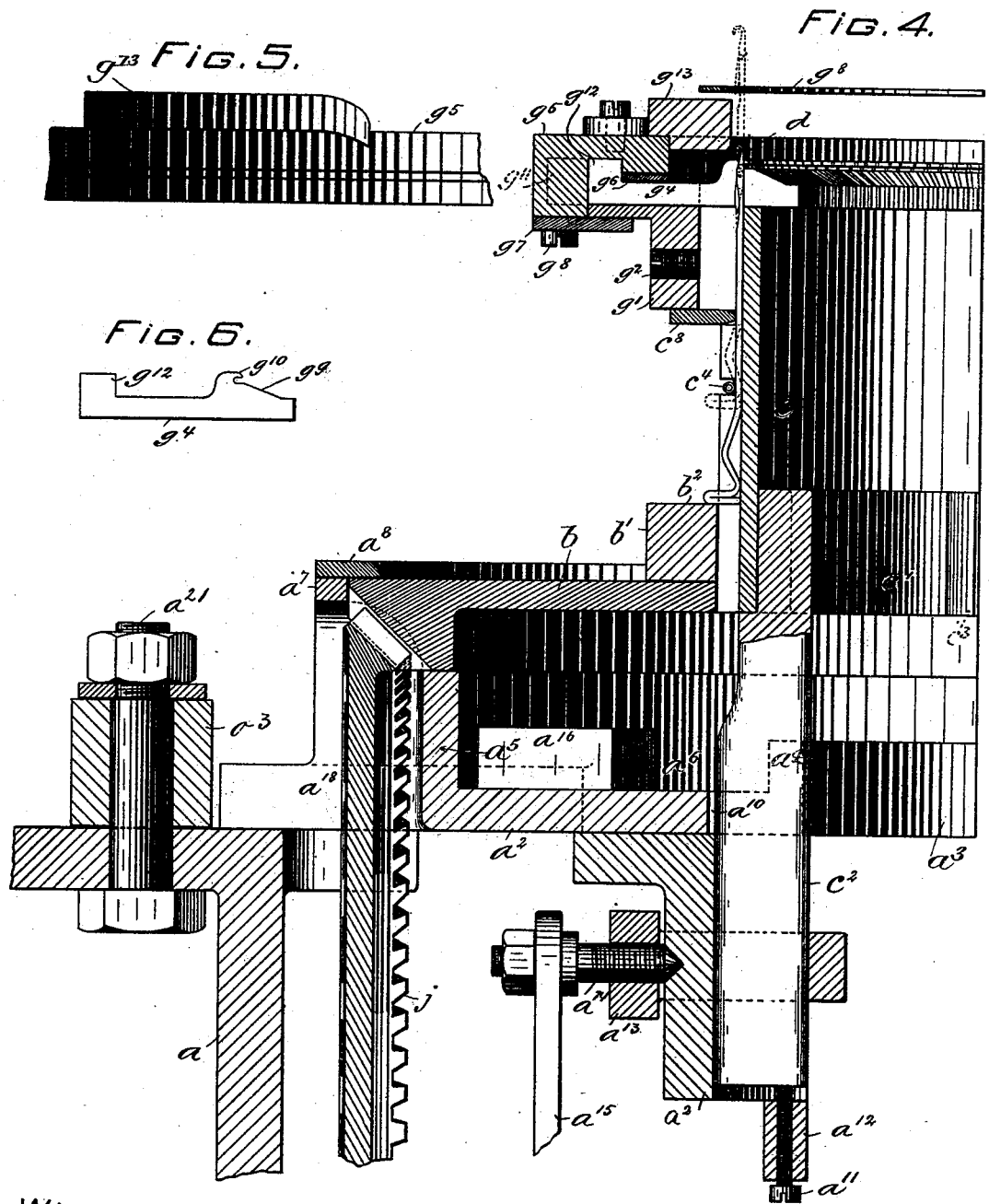

(No Model.) 12 Sheets—Sheet 3.
E. J. FRANCK.
CIRCULAR KNITTING MACHINE.
No. 508,512. Patented Nov. 14, 1893.
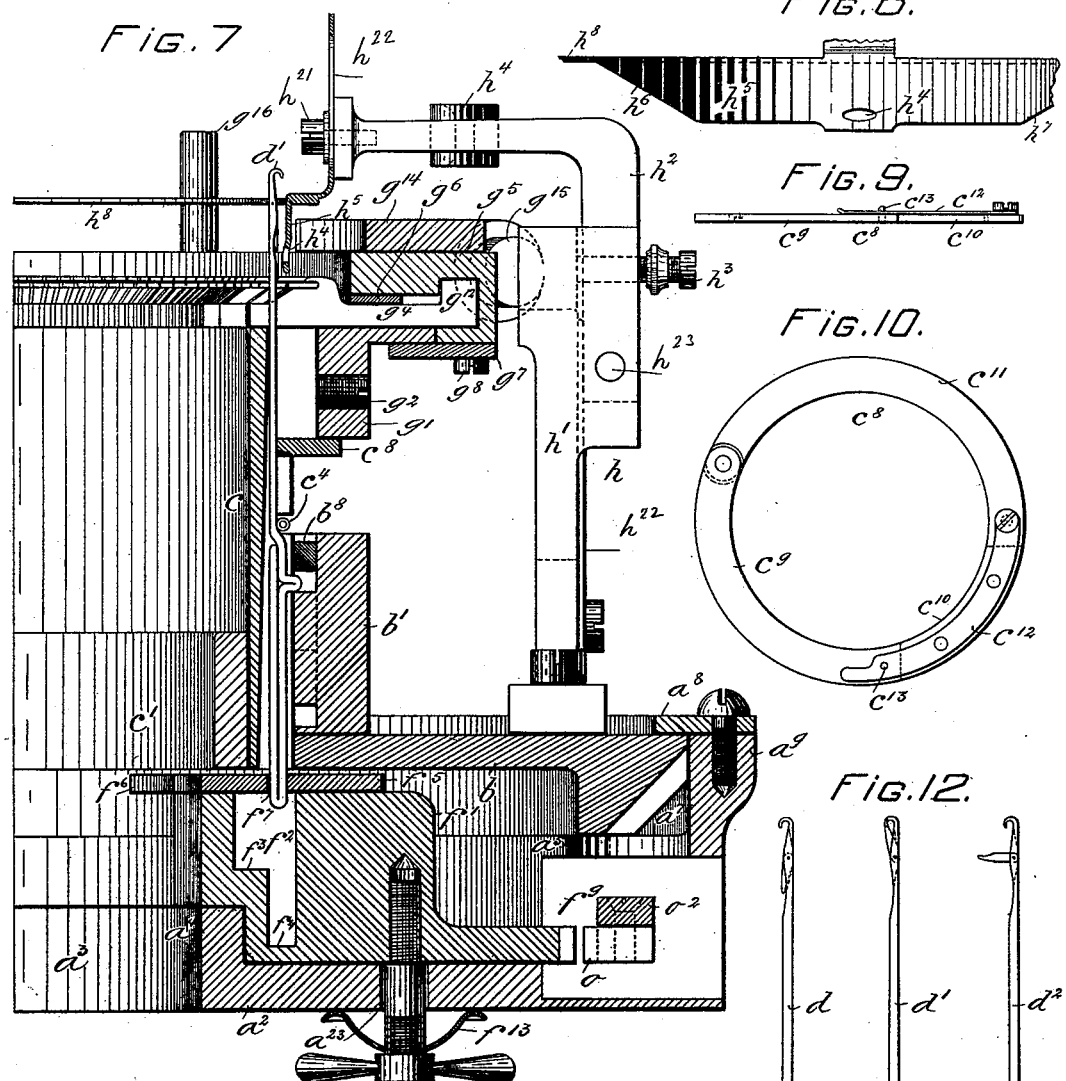
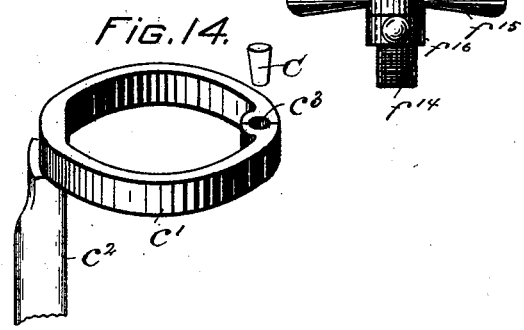
WITNESSES:
John W. Achard
W. A. Schaefer
INVENTOR.
Emil J. Franck
By J. Walter Douglass
ATT'Y.

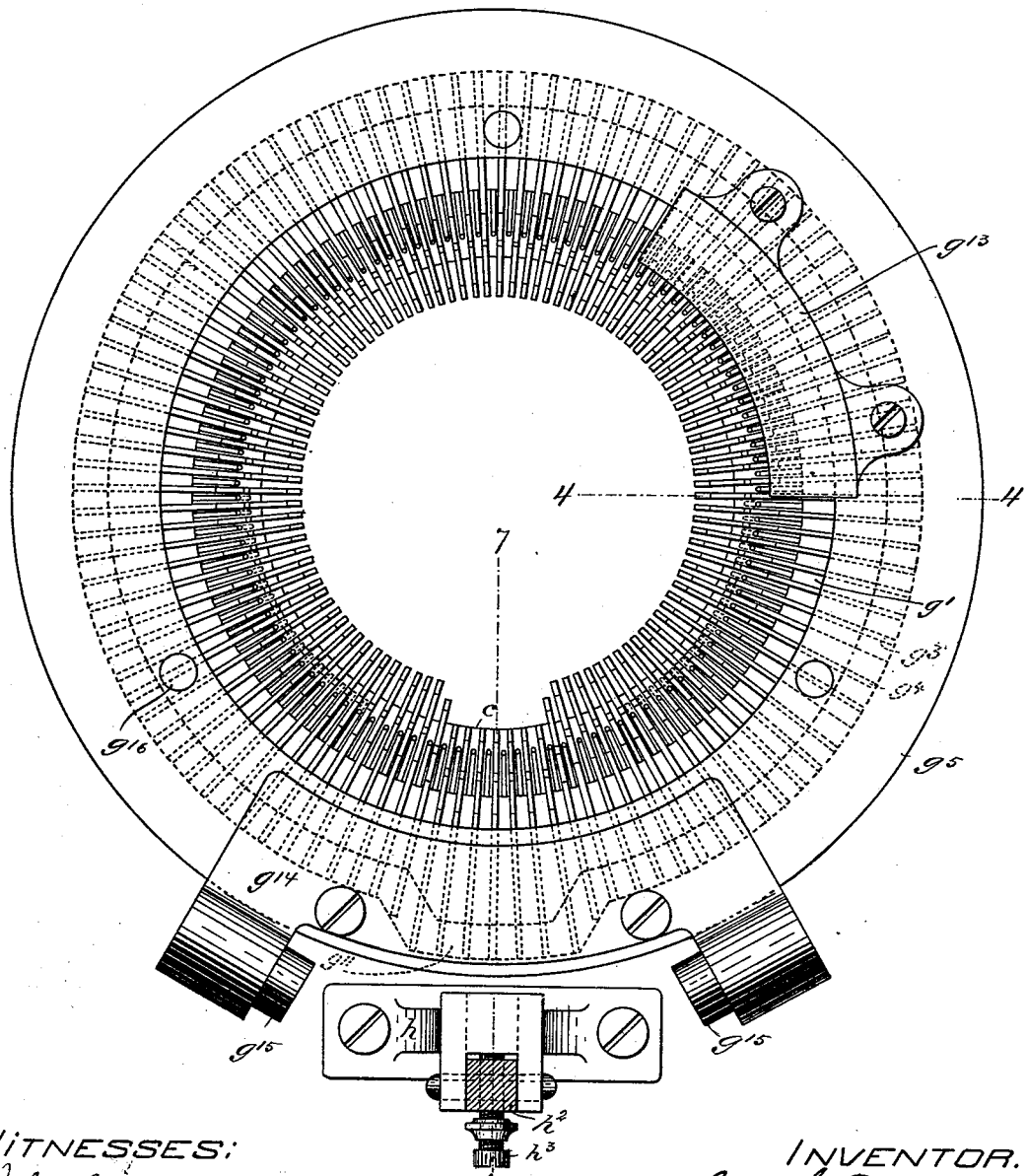

(No Model.) 12 Sheets—Sheet 5.
E. J. FRANCK.
CIRCULAR KNITTING MACHINE.

No. 508,512. Patented Nov. 14, 1893.

(No Model.) 12 Sheets—Sheet 6.
E. J. FRANCK.
CIRCULAR KNITTING MACHINE.
No. 508,512. Patented Nov. 14, 1893.
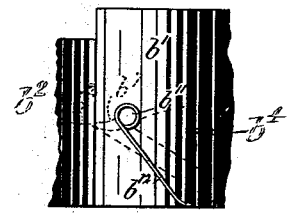
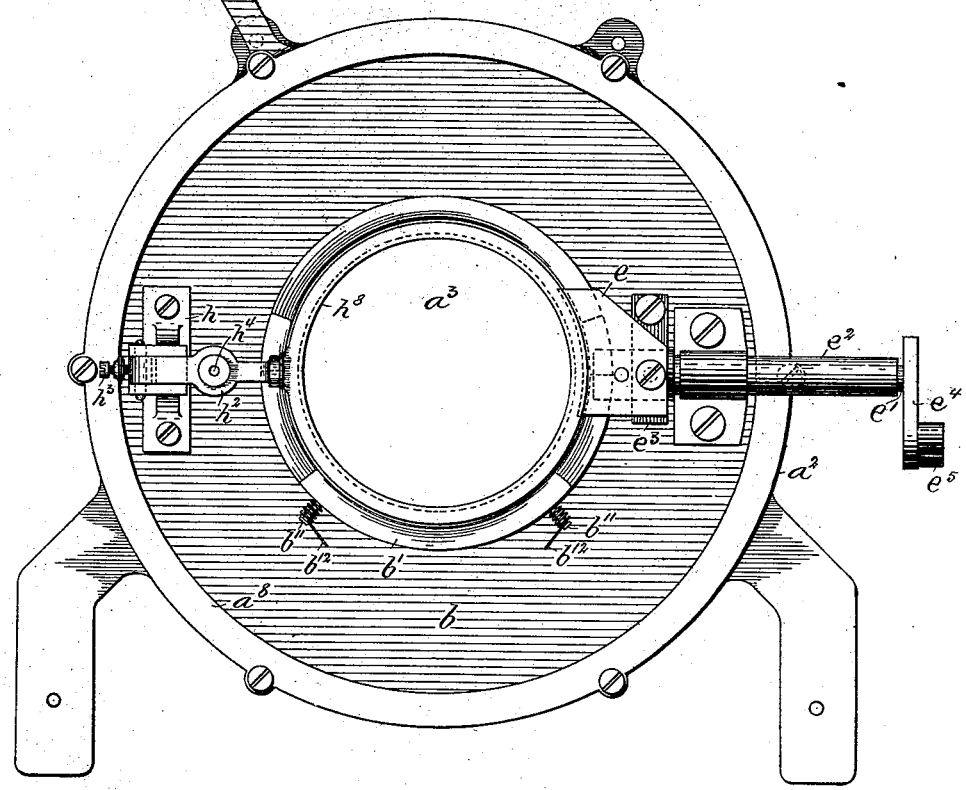
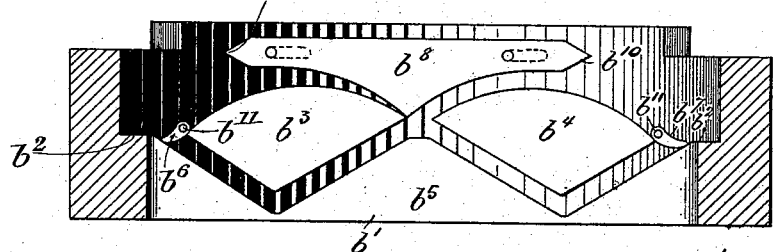
WITNESSES:
John W. Achard
W. A. Schaefer
INVENTOR.
Emil J. Franck,
By J. Walter Douglass
ATT'Y.
THE NATIONAL LITHOGRAPHING COMPANY,
WASHINGTON, D. C.

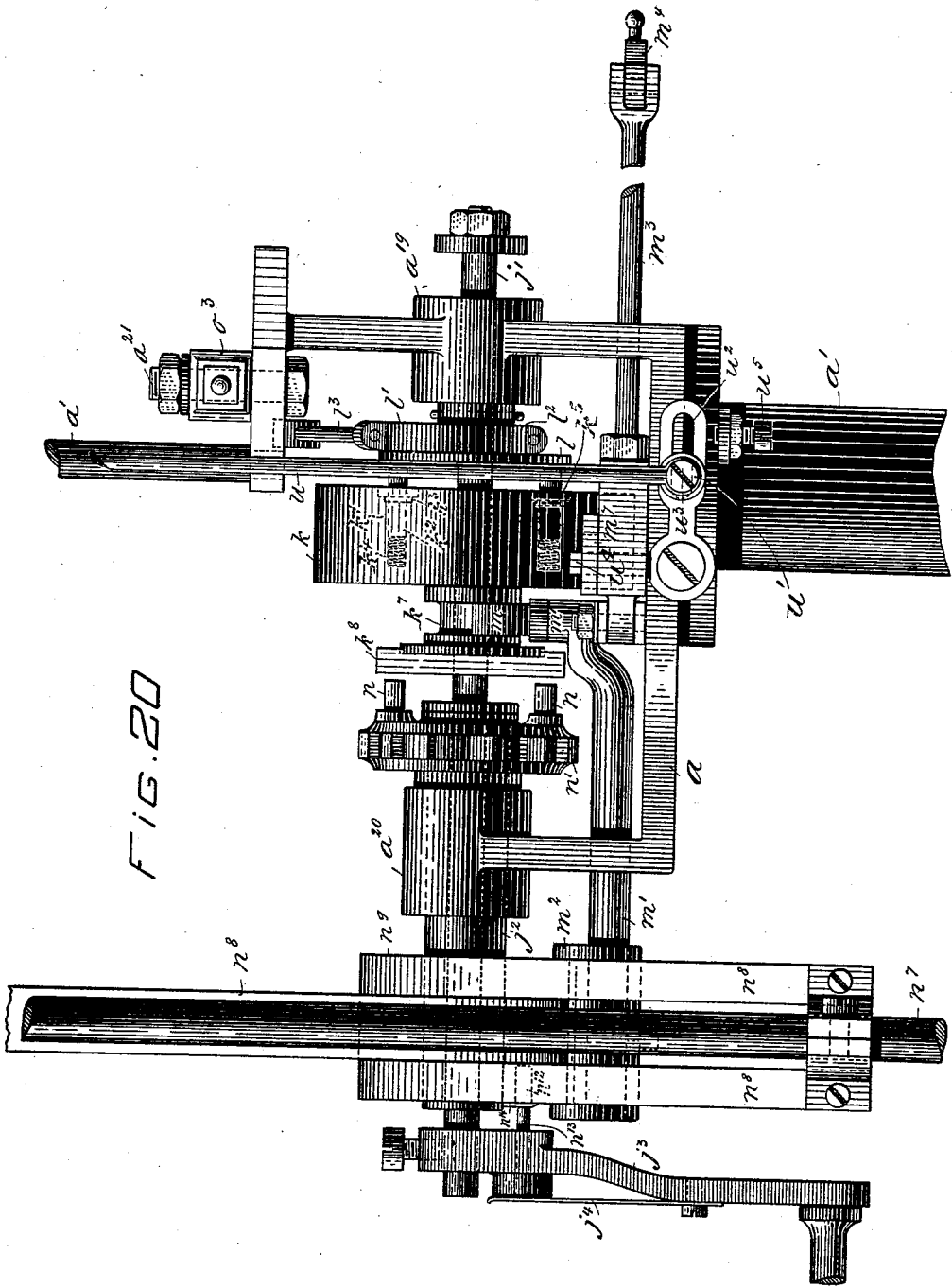

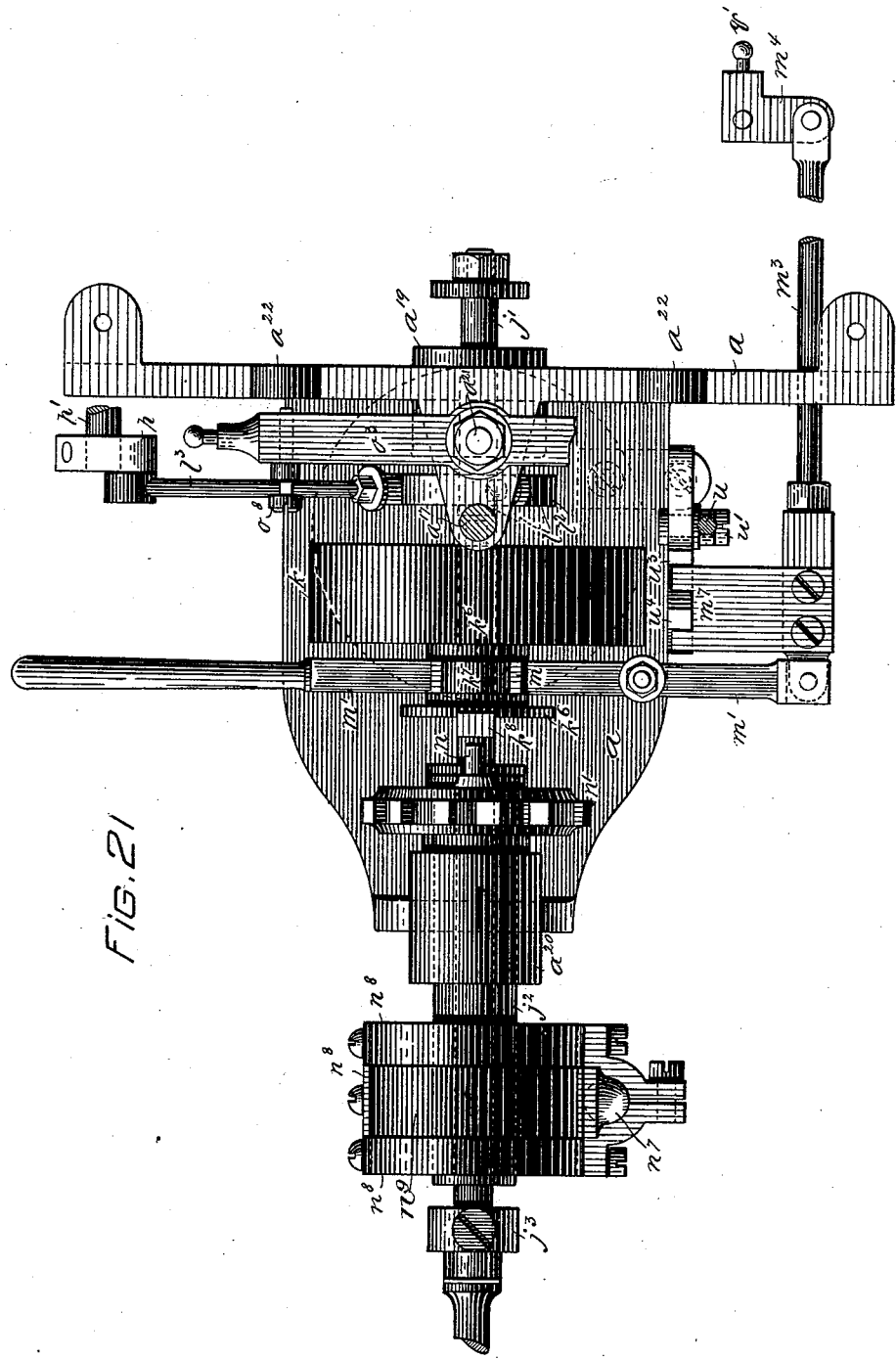

(No Model.)  12 Sheets—Sheet 9.
E. J. FRANCK.
CIRCULAR KNITTING MACHINE.
No. 508,512.  Patented Nov. 14, 1893.
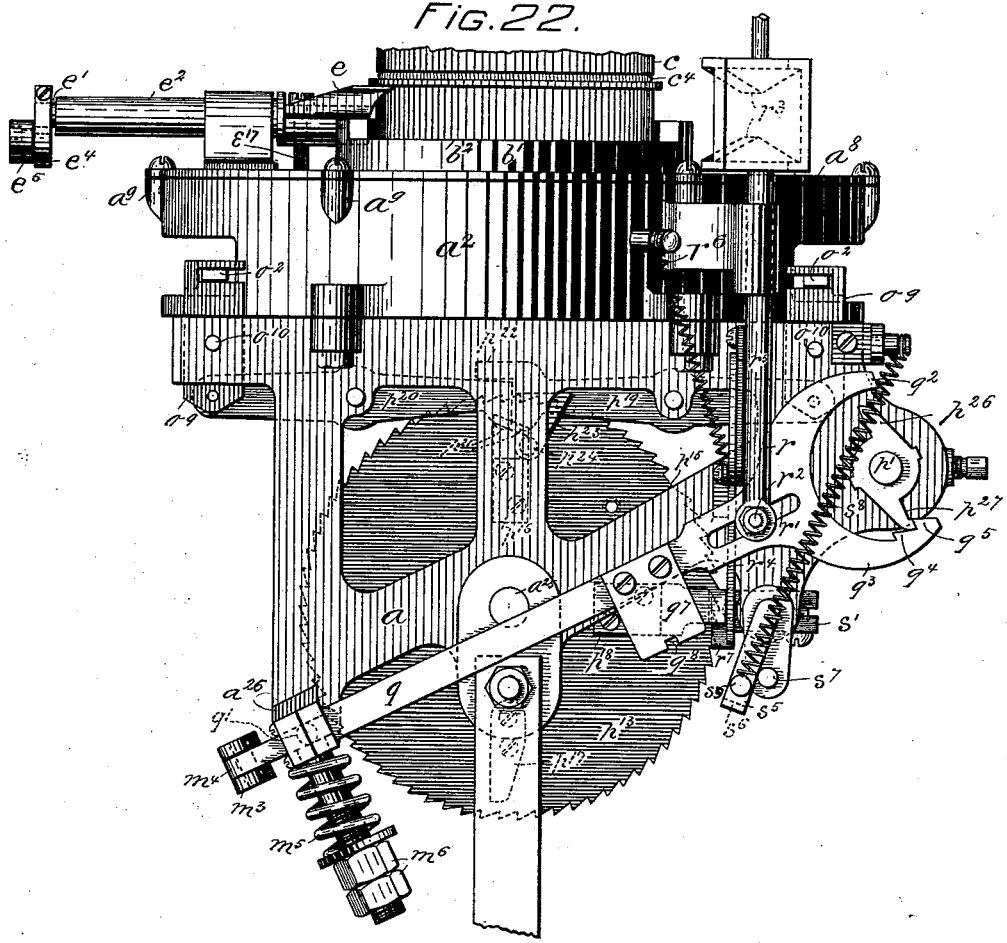
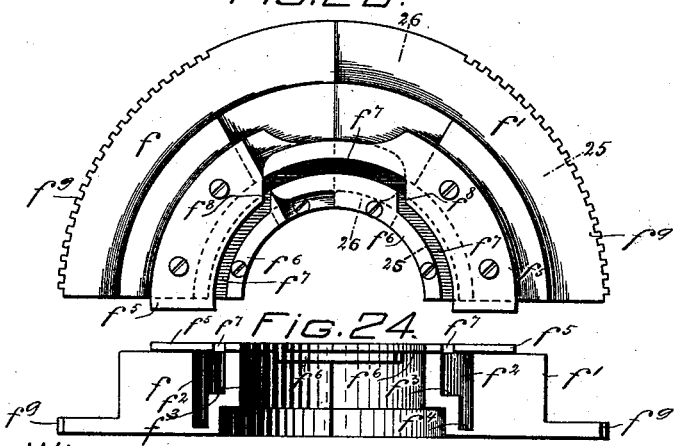
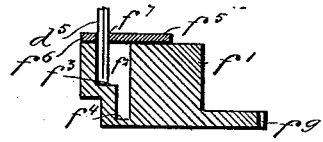
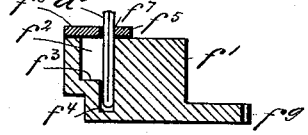
WITNESSES:
John W. Achard
W. A. Schaefer
INVENTOR
Emil J. Franck
BY J. Walter Douglass
ATT'Y.

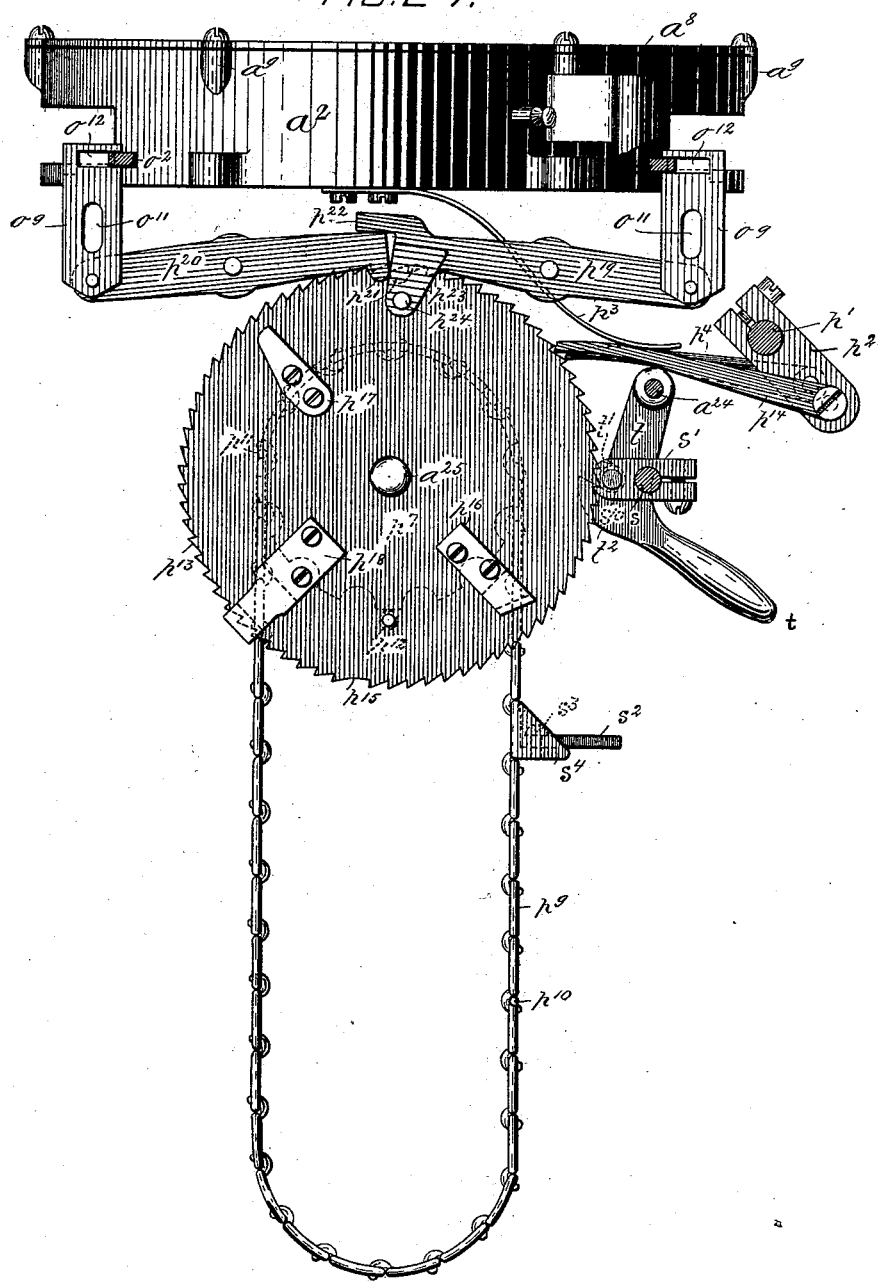

(No Model.)
E. J. FRANCK.
CIRCULAR KNITTING MACHINE.
No. 508,512. Patented Nov. 14, 1893.
12 Sheets—Sheet 11.
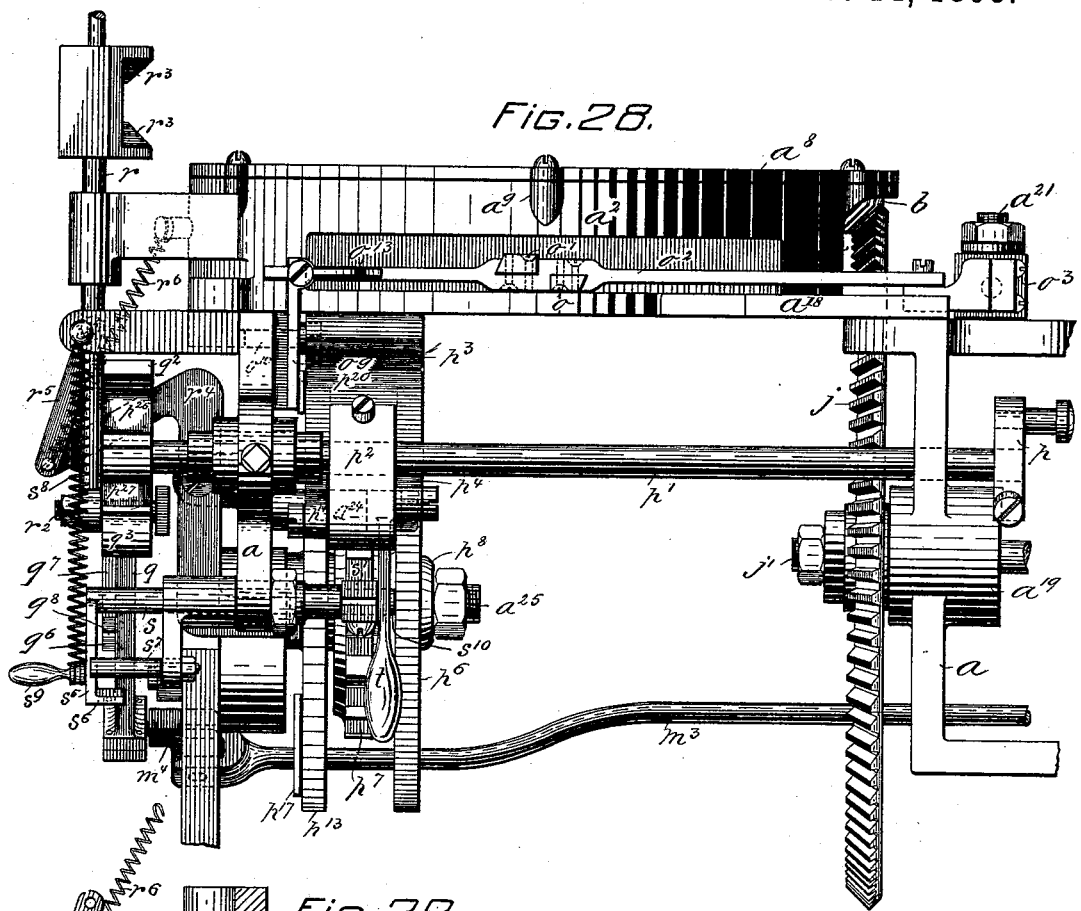
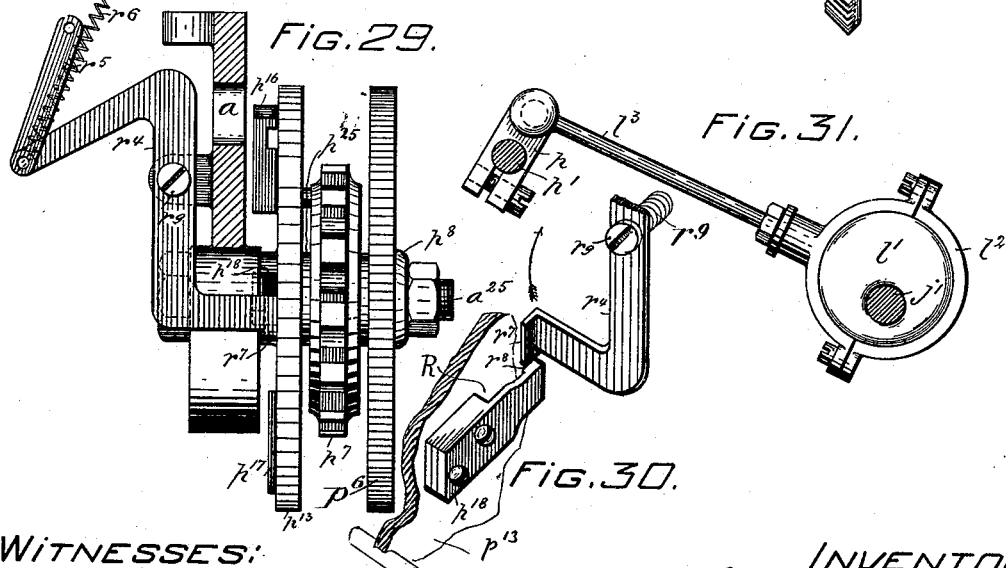
WITNESSES:
John W. Achard
W. A. Schaefer
INVENTOR.
Emil J. Franck,
By J. Walter Douglass.
ATT'Y.

(No Model.)  12 Sheets—Sheet 12.
E. J. FRANCK.
CIRCULAR KNITTING MACHINE.
No. 508,512.  Patented Nov. 14, 1893.
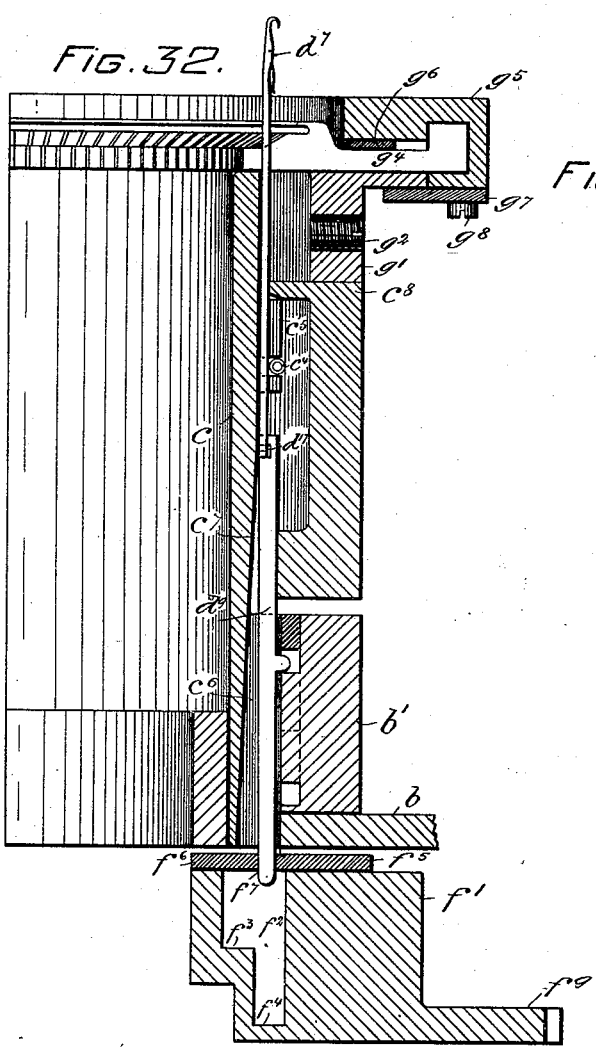
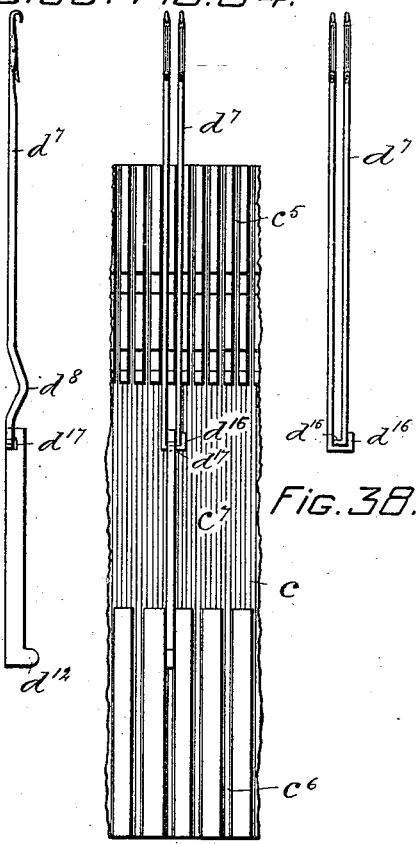
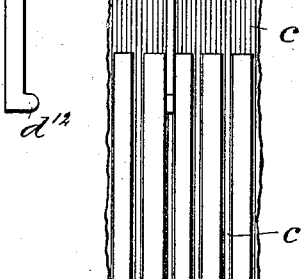
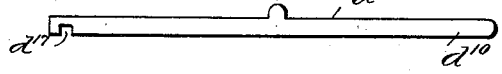
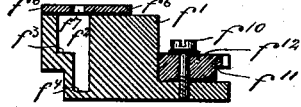
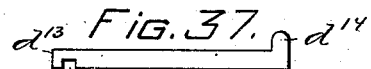
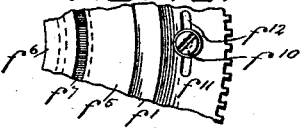
WITNESSES:
John W. Richards
W. H. Schaefer
INVENTOR.
Emil J. Franck,
BY J. Walter Douglass.
ATT'Y.

United States Patent Office.

EMIL J. FRANCK, OF PHILADELPHIA, ASSIGNOR TO THE NATIONAL AUTOMATIC KNITTER COMPANY, OF SAME PLACE AND NORRISTOWN, PENNSYLVANIA.

CIRCULAR-KNITTING MACHINE.

SPECIFICATION forming part of Letters Patent No. 508,512, dated November 14, 1893.

Application filed November 4, 1892. Serial No. 451,017. (No model.)

*To all whom it may concern:*

Be it known that I, EMIL J. FRANCK, a citizen of the United States, residing at the city of Philadelphia, in the county of Philadelphia and State of Pennsylvania, have invented certain new and useful Improvements in Circular-Knitting Machines, of which the following is a specification.

My present improvements are applicable in whole or in part to various types of knitting machines, but they are all applicable to and especially adapted for the knitting machines described and claimed in my United States Letters Patent No. 419,513, of January 14, 1890, and in my application for Letters Patent of the United States filed May 19, 1890, and serially numbered 352,325. Consequently I shall describe my present invention in connection with the particular types of knitting machines above referred to.

The principal objects of my invention are, first, to improve the construction and mode of operation of the sinker bars, needle cams and their accessories in such manner that the inclination of the needle cams may be more gradual than was heretofore possible; second, to provide simple, durable and efficient means whereby the number of needles employed upon the needle cylinder may be increased without interfering with the efficient operation of the fashioning needle controlling cams; third, to provide inexpensive and compact devices for automatically operating a suitable thread controlling device in order to effect the introduction of an extra thread at the required portion or portions of the knitted web; fourth, to provide efficient means for locking and unlocking the mechanism and power appliances that automatically control the movements of the needle-cylinder, fashioning needle controlling cams and thread controlling device, in such manner that the attendant-in-charge is prevented from accidentally or otherwise moving the parts of said mechanism or power appliance out of proper relation in respect to each other; fifth, to provide means for supporting the weight of the moving parts of the machine when the latter is stopped, in order to prevent or avoid retrograde movement thereof; sixth, to provide efficient and comparatively inexpensive means for imparting a reciprocating motion from the counter-shaft to the pawls that operate the fashioning needle controlling cam carriages; seventh, to insure the opening of the latches of the needles prior to the introduction of the thread into the hooks of the needles; eighth, to improve and simplify the means that serve to couple up the operating handle and reciprocating drum; and, ninth, to improve, simplify and perfect certain details of construction for purposes or objects hereinafter set forth.

My invention consists in the improvements and special features of construction hereinafter described and particularly pointed out in the claims.

The nature, scope and objects of my invention will be more fully understood from the following description taken in connection with the accompanying drawings forming part hereof, and in which—

Figure 1, is a rear elevation of a knitting machine embodying features of my invention. Fig. 2, is a detached view of certain of the parts shown in Fig. 1, which serve to prevent retrograde movement of the machine. Fig. 3, is a like view of the parts that serve to transmit motion from the counter-shaft to the pawls that drive the fashioning needle controlling cam carriages. Fig. 3ª, is a top or plan view of one of the segmental plates shown in Fig. 3. Fig. 4, is a sectional view taken on the line 4—4, of Figs. 15 and 16, and drawn to an enlarged scale in order to illustrate one portion of the needle cylinder and its accessories. Fig. 5, is a detail view of the device illustrated in Fig. 4 and carried by the sinker-cam and adapted to open the latches of the needles. Fig. 6, is a detail view of one of the sinker-bars shown in Fig. 4. Fig. 7, is a sectional view taken on the line 7—7, of Figs. 15 and 16, and drawn to an enlarged scale in order to illustrate another portion of the needle cylinder and its accessories. Fig. 8, is a detached elevational view of one of the parts that depends from the thread carrier and is shown in section in Fig. 7. Figs. 9 and 10, are respectively elevational and plan views drawn to a reduced scale and illustrating the sectional ring that is shown in Figs. 4 and 7 and that serves to confine the needles to their grooves. Fig. 11, is a view of one of the long bitted needles, showing the same provided with an off-set for engaging a retaining spring. Fig. 12, is a view of one of the fashioning needles. Fig. 13, is a view of one of the short bitted needles that are disposed intermediate of the two sets of fashioning needles and that are provided with off-sets for engaging a retaining spring. Fig. 14, is a perspective view illustrating the details of a ring provided with one member of a clamping device and adapted to be wedged in place within the needle cylinder as shown in Figs. 4 and 7. Fig. 15, is a top or plan view showing the sinker-head and certain of its accessories. Fig. 16, is a top or plan view illustrating the bed plate and the fashioning needle controlling cams and their accessories. Fig. 17, is a top or plan view of the machine with the needle cylinder removed and illustrating a ring carried by the thread-guide and adapted to keep the latches down. Fig. 18, is a transverse sectional view drawn to an enlarged scale and showing the operative portions of the needle cam. Fig. 19, is a view of the exterior of a portion of the cam cylinder, illustrating a spring for controlling the position of the switch cams shown in Fig. 18. Fig. 20, is a detached side view of certain of the power appliances and their accessories which are illustrated at the left hand side of Fig. 1. Fig. 21, is a top or plan view of the devices illustrated in Fig. 20. Fig. 22, is an elevational view of the upper portion of the right hand end of the machine shown in Fig. 1, and illustrating certain of the locking devices. Figs. 23 and 24, are respectively plan and elevational views of the fashioning needle controlling cams and their complemental carriages, shown in Fig. 16. Figs. 25 and 26, are respectively sections taken on the lines 25—25 and 26—26 of Fig. 23. Fig. 27, is a view similar to Fig. 22 with some of the parts illustrated in Fig. 22 removed. Fig. 28, is an elevational view of the upper portion of the front of the machine, illustrating certain of the locking devices. Fig. 29, is a detached view of certain of the parts shown but not clearly illustrated in Fig. 28. Fig. 30, is a perspective view showing means whereby the S-shaped lever shown in Figs. 22, 28 and 29, is shifted, locked and subsequently released. Fig. 31, is a detached view of the eccentric for actuating the rock shaft shown in Fig. 28. Fig. 32, is a sectional view of a needle cylinder adapted for the reception of a series of needles that are operated by jacks. Fig. 33, is a side view of a jack and its complemental needles detached. Fig. 34, is a front view of a portion of the needle cylinder shown in Fig. 32. Fig. 35, is a side view of one of the jacks that is adapted to operate the fashioning needles. Fig. 36, is a similar view of one of the jacks that is adapted to operate the needles disposed intermediate of the sets of fashioning needles. Fig. 37, is a view of one of the jacks that appertain to the instep needles. Fig. 38, is a view illustrating a set of two needles detached from their complemental jack. Fig. 39, is a sectional view illustrating a modified form of fashioning cam carriage provided with a detachable and adjustable rack; and Fig. 40, is a top or plan view of a portion of the cam carriage illustrated in Fig. 39.

In the drawings $a$, is the main frame-work of the machine mounted upon a pedestal $a'$, which supports it at a suitable distance above the floor. On this fixed frame-work $a$, is secured the bed-plate $a^2$, of the knitting machine. In the present instance the bed-plate $a^2$, is flat and is provided with a centrally disposed annular opening $a^3$, through which the work passes.

$a^4$ and $a^5$, are flanges projecting upward from the outer and inner peripheries or marginal portions of the bed-plate $a^2$. These rims $a^4$ and $a^5$, together with the bed-plate $a^2$, constitute ways $a^6$, for a purpose to be presently described. The outer rim $a^5$, together with the flange $a^7$ and ring $a^8$, constitutes a seat or bearing for a bevel gear $b$, that forms part of and carries the cam cylinder $b'$. This ring $a^8$, is bolted to suitable bosses $a^9$, upon the flange $a^7$, and consequently may be readily removed whenever it becomes necessary or desirable to remove the cam cylinder $b'$.

The cam cylinder comprises a needle rest $b^2$, two side cams $b^3$ and $b^4$, a lower lifting cam $b^5$, pivotal switch cams $b^6$ and $b^7$, and a shifting cam $b^8$, having beveled projecting extremities $b^9$ and $b^{10}$, Fig. 18. When the cam cylinder $b'$, is moving from left to right in Fig. 18, the bits of the needles travel off the needle rest $b^2$, rise upon the switch cam $b^7$, and pass thence over the side cam $b^4$, so as to strike the depending portion of the sliding cam $b^8$, thus moving the same toward the left into contact with the side cam $b^3$, so that the bits of the needles are directed beneath said side cam $b^3$, and the switch cam $b^6$ is lifted by the bits of the needles in order to permit the same to pass under it. When the cam cylinder moves from right to left the operation of the respective cams is simply reversed.

From the above description it appears that it is important to cause the switch cams $b^6$ and $b^7$, to normally contact with the needle rest $b^2$, as shown in Fig. 18. This result is accomplished by extending the shanks $b^{11}$, that carry the switch-cams through the cam cylinder and providing the outer extremities of said shanks with springs $b^{12}$, Figs. 17 and 19, that tend by their resiliency to maintain the switch cams $b^6$ and $b^7$ in the required position and are nevertheless adapted to yield and thus permit of the elevation of the switch cams by the needle bits.

The needle cylinder $c$, fits snugly in the central opening of the cam cylinder.

$c'$, Fig. 14, is a split ring provided with a downwardly projecting leg $c^2$, and adapted to be clamped to place in the needle cylinder $c$, by means of a wedge or plug C, adapted to recesses $c^3$ in the adjacent ends of the ring $c'$. This downwardly projecting leg $c^2$, is adapted to a recess $a^{10}$, in the bed-plate $a^2$, of the machine, and is supported upon a set screw $a^{11}$, in a cross bar $a^{12}$, of the framework beneath the recess.

$a^{13}$, is a clamping yoke connected with the frame-work $a^2$, by means of the pointed extremity of a set-screw $a^{14}$, that works in a suitable seat in the bed-plate.

$a^{15}$, is a hand-lever connected with the head of the set-screw $a^{14}$, and adapted to afford means whereby the same may be rotated in order to effect the required movements of the yoke for clamping and unclamping the leg $c^2$, and thus securing or releasing the needle cylinder $c$.

Three different varieties of needles $d$, $d'$ and $d^2$, Figs. 11, 12 and 13, are employed.

The instep needles $d$, Fig. 11, i. e. the needles which are to remain out of action during the operation of widening, narrowing or otherwise fashioning the web, are provided with long bits $d^3$, adapted for engagement with the knitting cams, and with projections $d^4$, adapted to be engaged by a retaining spring $c^4$, which is fitted into a circumferential notch in the needle cylinder.

The fashioning needles $d'$, Fig. 12, are provided with long straight shanks, as at $d^5$, with which engage fashioning needle controlling cams, to be hereinafter more fully described. The needle grooves which appertain to the fashioning needles are inclined inward at the lower portion of the needle cylinder $c$, as shown in Fig. 7, in order to permit the fashioning needles to be shifted radially inward at their lower extremities in order to carry their bits inward out of range of the knitting cams on the cam ring $b'$.

The heel needles $d^2$, Fig. 13, that are disposed intermediate of the two sets of fashioning needles $d'$, are similar to the instep needles, with the exception that their bits $d^6$, are somewhat shorter than the bits of the instep needles.

The object of making the bits of the instep needles long and those of the heel and fashioning needles short, is to permit of the ready elevation of the instep needles in order to carry their bits out of range of the knitting cams, and thus throw the instep needles out of action, in order to permit of the widening and narrowing of the web by means of the fashioning and heel needles. This elevation of the instep needles $d$, is effected by means of a switch plate $e$, which is attached to one extremity of a shaft $e'$, mounted in a bearing $e^2$ carried by the gear wheel $b$. The switch plate $e$, is capable of assuming two positions, one for lifting the instep needle bits out of range of the knitting cams and into inoperative position, and the other for drawing the instep needle bits into range of the knitting cam. This switch plate $e$, is retained in respect to accidental displacement in either of these positions by means of a spring $e^3$, which acts upon a screw $e^{17}$ or other projection on the shaft $e'$. The outer extremity of the shaft $e'$, is provided with an arm $e^4$, having a pin or roller $e^5$, which is acted upon by devices hereinafter fully described.

$f$ and $f'$, are flat carriages afforded a range of movement in the ways $a^6$, of the bed-plate $a^2$, and provided respectively with a groove $f^2$, having two seats $f^3$ and $f^4$, Figs. 25 and 26, formed therein. The seat or ledge $f^3$, engages the lower ends of the fashioning needles, Fig. 25, when the same are out of action and supports the needles themselves in such manner that when they are again thrown into action the bits are above the needle rest and in position for properly re-engaging the knitting cams. By these means such jamming of the needle bits into the knitting cams, as would occur if the fashioning needles were not supported by the seat or ledge $f^3$, is avoided. The seat $f^4$, which forms the bottom of the groove $f^2$, underlies the lower extremities of the fashioning needles, Fig. 26, when the latter are in action and adds considerably to the strength of the carriages.

$f^5$, are plates applied to the portions of the carriages $f$ and $f'$, that lie outside of the grooves $f^2$; and $f^6$, are plates applied to the portions of the carriages $f$ and $f'$, that lie inside of the grooves $f^2$.

$f^7$, are openings formed intermediate of the plates of each carriage. These openings are of different radii and are connected by an inclined portion, as at $f^8$. The portion of the openings farthest from the center of the needle cylinder $c$, is in alignment with the seat $f^4$, of the groove $f^2$, Fig. 26, and serves to maintain the lower extremities of the fashioning needles $d'$, in such position that the bits thereof engage the knitting cams. The portion of the openings $f^7$ nearest the center of the needle cylinder is in alignment with the ledge or seat $f^3$, of the groove $f^2$, Fig. 25, and serves to maintain the lower extremities of the fashioning needles in such position that the bits thereof are held out of range of the knitting cams. The inclined portions $f^8$, of the grooves serve to transfer the fashioning needles from one of the curved portions of the grooves $f^7$, to the other, and consequently serve to throw the fashioning needles into and out of action.

From the foregoing description it will be seen that the lower portions of the fashioning needles are guided at all times by the plates $f^5$ and $f^6$, and consequently are not susceptible of accidental displacement, and that the shanks of the fashioning needles are moved radially, i. e. edgewise, onto the ledge or seat $f^3$, which extends throughout the length of the carriage in contradistinction to being slid sidewise upon a ledge that is not co-extensive with the carriage.

It may be remarked that the extremities of the plates $f^5$ and $f^6$, project toward each other beyond their complemental carriages and that one of these extremities is offset and lies in a lower horizontal plane than the other, as shown in Fig. 24, so that the extremities of these plates are adapted to overlap each other, as shown in Fig. 23, in order to permit the carriages $f$ and $f'$, to collide with each other at one end of their travel; it being understood that the range of movement of the carriages in a reverse direction is limited by means of buffers $a^{16}$, projecting upward from the bed-plate $a^2$, of the machine.

The peculiar form of the inclined portion $f^8$, of the openings $f^7$ necessarily limits the number of the needles employed, because if the needles are very numerous and are spaced near together, the lower extremities of two or more needles would tend to enter the inclined portion $f^8$, and would consequently become jammed and otherwise interfere with the proper operation of the machine. These disadvantageous features may be avoided, and a needle cylinder having a great number of needles may be advantageously constructed according to my invention in the following manner.

Referring more particularly to Figs. 32 to 37, all the needles $d^7$, are of the same length and are provided with projections $d^8$, for engaging the retaining spring $c^4$, except the fashioning needles, Fig. 32, in which the projections are omitted.

$d^9$, Fig. 35, are jacks adapted to operate two or more fashioning needles and provided with long shanks $d^{10}$, for engaging the fashioning needle controlling cams.

$d^{11}$, Fig. 36, are jacks for operating two or more heel needles, and provided with short bits $d^{12}$, adapted to engage the knitting cams and to pass out of range of the switch plate $e$.

$d^{13}$, Fig. 37, are jacks adapted to operate two or more instep needles and provided with long bits $d^{14}$, for engaging the knitting cams and switch plate $e$. The needles and jacks are coupled together by bending the lower portion of one of the shanks of one of the needles at right angles to itself, as shown at $d^{15}$, in Fig. 38, and bending the shank of the other needle in a similar manner and also upward as shown at $d^{16}$, in said figure, so that the shanks of the needles may be fitted together and locked in such position by means of a slot $d^{17}$, in the jack, as shown in Figs. 33 and 34. In the present instance the needle grooves do not extend from the top to the bottom of the needle cylinder, but the top of the needle cylinder is provided with a series of grooves $c^5$, for the reception of the needles, and the bottom of the needle cylinder is provided with a less number of grooves $c^6$, for the reception of the jacks, and the portion of the needle cylinder intermediate of the grooves is cut away as at $c^7$, Fig. 34, in order to accommodate the couplings between the needles and their complemental jacks.

The cam carriages $f$ and $f'$ are provided with peripheral racks $f^9$, by means of which they are driven in a manner to be presently described. Of course the number of teeth upon the racks $f^9$, depends upon the number of fashioning needles or fashioning needle jacks that are employed. In order to accommodate the machine to needle cylinders having different numbers of fashioning needles or fashioning needle jacks, the racks may be made separate from the carriages and designed to co-operate with different needle cylinders.

Referring to Figs. 39 and 40, the carriages are provided with set-screws $f^{10}$, and the shanks of the racks $f^{11}$, are provided with slots $f^{12}$, so that the racks may be detachably connected to the carriages and may be properly adjusted in respect thereto.

The ribs between the grooves of the needle cylinder are notched, Figs. 32 and 7, to form a seat for the reception of a ring $c^3$, Figs. 9 and 10, which serves to hold the needles in their grooves. In Fig. 32, the ring $c^8$, is seated at its upper portion in notches in the ribs of the needle cylinder and is provided upon its inner face with a cavity for accommodating the couplings of the needles and jacks and extends downward and then inward into position for guiding the jacks. Referring to Figs. 9 and 10, this ring comprises three parts. Two of these parts $c^9$ and $c^{10}$, are hinged to the respective extremities of the third part $c^{11}$, and the two hinged parts are adapted to be detachably connected to each other by means of a spring clasp $c^{12}$, and its complemental pin $c^{13}$, so that the part $c^{10}$, may be readily opened to permit of the removal from the cylinder of any one of the needles or jacks and needles into line with which the part $c^{10}$ has been shifted, and so that the ring itself may be readily removed whenever it becomes necessary or desirable so to do. By these means any of the needles of the cylinder may be readily removed and new needles inserted in their places.

It may be remarked that the ring shown in Fig. 32, is composed of hinged sections similar to those illustrated in Fig. 10.

There is a sinker-head $g$, Fig. 1, at the top of the needle cylinder, and it will be understood that this is to be taken off preparatory to removing or replacing a needle. This sinker-head comprises an annular bed $g'$, clamped to place upon the wide portions, Fig. 7, of the webs between the grooves of the needle cylinder $c$ by means of set-screws $g^2$, and provided upon its upper face with radial grooves $g^3$, Fig. 15, for the reception of sliding sinker-bars $g^4$, of which there is preferably one for each needle. The annular bed $g'$, may be adjusted to place upon the needle cylinder $c$, by means of the ring $c^3$, which for the purpose serves as a gage, whereupon the annular bed $g'$, is clamped in position in the manner above described.

$g^5$, is a sinker-cam revolubly mounted upon a washer $g^6$, carried by the webs or ribs between the sinker-bars $g^4$, and held against accidental displacement in an upward direction by means of a ring $g^7$, engaging the under face of the sinker-bed and detachably connected with the sinker cam by means of screws $g^8$. It may be remarked that the washer $g^6$, affords a bearing for the sinker-cam and thus prevents undue wear upon the webs of the sinker-grooves as well as upon the sinkers themselves. Each of the sinker-bars is provided with an inclined working edge $g^9$ and its complemental stop $g^{10}$, Fig. 6. In use the needles draw the thread down over or form the stitches upon the inclined edges $g^9$, and the sinker-bars $g^4$, are projected radially toward the center of the needle cylinder, and the thread rides up on the inclined edges $g^9$, so that the stitches are opened by the sinker bars as well as by the depression of the needles. Inasmuch as the stitch is partially formed by the sinker bars, it follows that the needles need not be depressed to the same extent as is necessary in forming stitches solely by the depression of the needles. Consequently the inclination of the groove between the knitting cams $b^3$, $b^4$ and $b^5$, Fig. 18, is considerably less than heretofore. The groove in the sinker-cam $g^5$, is provided with an operative portion $g^{11}$, Fig. 15, that engages the bits $g^{12}$, Fig. 6, of the sinker bars $g^4$, and thus draws them outward and then forces them inward to assist in the formation of the stitch. The sinker-cam $g^5$, is also provided with an ear $g^{13}$, Figs. 4, 5 and 15, that engages the latches of the needles and opens the same. The required rotary motion is imparted to the sinker-cam $g^5$, through the intervention of arms $g^{14}$, Fig. 15, that are provided with rubber or other yielding buffers $g^{15}$, that are disposed in range of the shank of the yarn carrier $h$. This yarn carrier $h$, Fig. 7, comprises a post $h'$, secured to the bevel gear wheel $b$, and an arm $h^2$, pivotally carried by said post $h'$, and provided with an adjusting screw $h^3$, that collides with the post $h'$, and thus affords means for adjusting the position of the pivotal arm $h^2$, it being understood that there is a spring $h^{22}$ bearing against the lower end of the part $h^2$, and that the post $h'$, is slotted opposite the pivot $h^{23}$ of the part $h^2$, as shown in the drawings.

$h^4$, are thread eyes through which the yarn passes.

$h^5$, Fig. 8, is a shield adjustably connected with the pivotal arm $h^2$ by means of a set-screw $h^{24}$ working in a slot $h^{25}$ as shown in Fig. 7, and provided with beveled extremities $h^6$ and $h^7$ for opening the latches of the needles.

$h^8$, is a ring formed integral with or secured to the guard or shield $h^5$, and adapted to prevent the latches from being accidentally closed when the needles are elevated by the knitting cams.

$g^{16}$, are pins or studs projecting upward in order to form bearings for movably supporting a transfer frame, which is not shown, but which may be of the type described in my application for a patent filed August 18, 1892, and serially numbered 443,429, or of any other preferred type, it being understood that the pivotal arm $h^2$, is turned into open position in order to accommodate the transfer frame.

$a^{17}$, is a standard projecting upward from the frame-work $a$, of the machine, and adapted to support a thread controlling device, which operates to effect the introduction of an extra thread from the bobbin $i$. The thread controlling device illustrated in Fig. 1, is the same as is described in my application for Letters Patent of the United States filed August 22, 1892, and serially numbered 443,719. This thread controlling device comprises first a bracket $i'$, adjustably connected to the standard $a^{17}$, by means of a split ring and its complemental set-screw; second, a clamping arm $i^2$ for pressing the extra thread against the bracket $i'$, in order to cause the same to be broken at a point near the needles; third, an arm $i^3$, adapted to be lifted upward in order to slacken or feed the extra thread after it has been released by the elevation of the clamping arm; fourth, a take-up spring $i^4$ and its complemental automatic detent $i^5$, which co-operate to regulate the feed of the main thread $i^{77}$ and to take up any slack in the same which may occur by reason of the overthrow of the yarn carrier when the latter is moved to and fro.

The driving mechanism whereby the required movements of the cam cylinder $b'$, and its accessories, are attained will now be described.

The bevel gear $b$, of the cam cylinder $b'$, meshes with a driving gear $j$, for the accommodation of which the bed plate $a^2$, is suitably cut away as at $a^{18}$, in Figs. 4 and 16. This driving gear $j$, is keyed or otherwise secured to the inner extremity of a shaft $j'$, revolubly supported in a bearing $a^{19}$, in the main-frame, and in a sleeve $j^2$ turning in a bearing $a^{20}$, in said frame, and the outer extremity of said shaft is provided with a crank $j^3$, by means of which the machine may be operated by hand, for example, when a so-called top is being run onto the needles by means of a transfer frame.

$k$, is a driving pulley revolubly mounted upon the shaft $j'$, and provided upon its inner face, Fig. 20, with recesses $k'$, in which are mounted pins $k^2$, provided with collars $k^3$, and also springs $k^4$, for causing said collars to normally engage washers $k^5$, encircling the pins and fitted snugly into the recesses $k'$. The projecting extremities of these pins $k^2$, are adapted for engagement with a bar $l$, on an eccentric $l'$, keyed or otherwise secured to the shaft $j'$. The opposite face of the pulley $k$, is provided with a hub $k^6$, having a groove $k^7$, for the reception of a shifter fork $m$, carried by a shifter lever $m'$, hereinafter more fully described. The hub $k^6$, is provided with a bar $k^8$, which is adapted for engagement with lugs or pins $n$, projecting from the face of a sprocket wheel $n'$, mounted upon the sleeve $j^2$ in such manner that it is free to turn thereon. These pins $n$, may be provided with suitable springs and secured to the sprocket wheel in the same manner that the pins $k^2$ are secured to the pulley $k$, and the pins $k^2$, may be rigidly secured to the pulley $k$. However, excellent results have been obtained by the employment of pins that are projected forward by springs, because the springs by yielding prevent accidental breakage of the pins.

$n^2$, is a counter-shaft revolubly mounted in bearings in the pedestal $a'$, and provided with a tight sprocket-wheel $n^3$, which is driven from the wheel $n'$, by means of a sprocket chain $n^4$. This shaft is also provided with a crank $n^5$, the pin of which is provided with a ball $n^6$, that is adapted to a socket or bearing at the lower extremity of a rod $n^7$. The upper portion of this rod $n^7$, is provided with clamps for holding the respective extremities of straps or bands $n^8$, that are wound in opposite directions around and secured to a drum $n^9$, free to turn on the sleeve $j^2$. During the upward movement of the rod $n^7$, one of the straps $n^8$, acting upon the under portion of the drum $n^9$, causes the same to be rotated in one direction. During the downward movement of the rod $n^7$, the other two of the straps $n^8$ acting over the top of the drum $n^9$, cause the same to be rotated in a reverse direction. The continued reciprocation of the rod $n^7$, causes the drum $n^9$, to be rotated first in one direction and then in a reverse direction, or in other words, to be reciprocated. The weight of the crank $n^5$, rod $n^7$ and parts connected therewith tends to cause the machine to be run backward.

$n^{10}$, is a detent pivotally connected with the pedestal $a'$, and adapted to mesh with a tooth $n^{11}$, projecting from the counter shaft $n^2$, Fig. 2, in such manner that undue retrograde motion of the shaft $n^2$, is prevented and the same is constrained to come to rest in proper position for permitting of the subsequent operation of the machine.

$m^2$, Fig. 20, is a shifter fork carried by the shifter bar $m'$, and adapted to engage the respective faces of the drum $n^9$, in order to shift the same endwise on the sleeve $j^2$. The outer face of the drum $n^9$, is provided with an aperture $n^{12}$, for the reception of a pin $n^{13}$, Fig. 20, afforded a range of motion transversely of the handle $j^3$, in which it is located and normally impelled toward the drum $n^9$, by means of a spring $j^4$.

$n^{14}$, is a beveled cam block applied to the drum $n^9$, and located adjacent to the opening $n^{12}$, in order to cause the pin $n^{13}$, to ride up on the cam block $n^{14}$, whereby the spring $j^4$, is subjected to pressure and thus when released causes the pin $n^{13}$, to be projected into the opening $n^{12}$, with a quick and positive motion. The spring $j^4$, also yields, and thus permits the drum $n^9$, to be shifted with a positive motion and without jamming or otherwise injuring the pin $n^{13}$.

The mode of operation of the hereinabove described driving mechanism is as follows:—
When the machine is fabricating a tubular web, the cam cylinder $b'$, and consequently the yarn carrier $h$, and sinker-cam $g^5$, are rotated. This result is accomplished by shifting the free extremity of the shifter lever $m'$, toward the right in Fig. 21, whereby the pulley $k$, is shifted in such manner that the pins $k'$, engage the bar $l$, thus causing the rotary motion of the pulley $k$, to be imparted to the eccentric $l'$, and consequently to the shaft $j'$, and bevel gear wheel $j$. When the machine is knitting a flat web, the cam cylinder $b'$, and consequently the yarn carrier $h$, and sinker cam $g^5$, are reciprocated. This result is accomplished by shifting the free extremity of the shifter lever $m'$, toward the left in Fig. 21, whereby the hub $k^6$, of the pulley $k$, is shifted into position for permitting the bar $k^8$, to engage the pins $n$. This motion of the shifting lever $m'$, acting through the intervention of the shifting fork $m^2$, also causes the drum $n^9$, to be shifted into position for causing the pin $n^{13}$, in the handle $j^3$, to engage with the recess $n^{12}$. Under these circumstances the rotary movement of the pulley $k$, is transmitted to the sprocket wheel $n'$, and thence to the counter-shaft $n^2$ and crank $n^5$, thus effecting the reciprocation of the rod $n^7$. The reciprocating movement of the rod $n^7$, is imparted to the drum $n^9$, handle $j^3$, shaft $j'$, and consequently to the bevel gear wheel $j$. When the shifter lever $m'$, occupies a position intermediate of its extreme range of travel, as shown in Fig. 21, the pulley $k$, runs loose on the shaft $j'$. Consequently the machine comes to rest and the cam cylinder $b'$, and its accessories may be operated manually by means of the handle $j^3$.

The mechanism whereby the various changes in the operation of the driving gear and of the machine are produced, will now be described.

The racks of the carriages $f$ and $f'$, are acted upon by pawls $o$ and $o'$, carried by reciprocating bars $o^2$, hung to the opposite ends of a lever $o^3$, by means of ball bearings. This lever $o^3$, is mounted upon a stud $a^{21}$, secured to the frame-work $a$, and is oscillated by the upper extremity of a lever $o^4$, centrally pivoted to the pedestal $a'$, as shown in Fig. 1. The lower extremity of this lever $o^4$, is provided with a friction roller $o^5$, and is vibrated by means of cam shaped tappets $o^6$, on the counter-shaft $n^2$. These cam shaped tappets, Figs. 3 and $3^A$, are formed integral with segmental plates adjustably connected by means of set screws $o^7$ and their complemental slots, with a sleeve $n^{15}$, keyed or otherwise fastened to the shaft $n^2$, so that the segmental plates may be adjusted in the direction of the length of the shaft $n^2$, in order to increase or diminish the throw of the lever $o^4$, and consequently of the pawls $o$ and $o'$, whereby the machine may be accommodated to the carriages $f$ and $f'$, having racks provided with different numbers or sizes of teeth.

$o^8$, Figs. 16 and 21, are adjusting screws inserted through suitable apertures in the lever $o^3$, in such manner that their points are adapted to contact with back-stops $a^{22}$, on the main frame $a$, in order to limit the range of motion of the lever $o^3$, thus taking up any spring or backlash in the lever $o^4$ and its accessories, and consequently insuring accuracy in the operation of the pawls $o$ and $o'$. The pawls of each bar comprise plates provided with a single tooth and secured to place in recesses in the upper and lower faces of the bars $o^2$, as shown in Figs. 16 and 28, so that by elevating the outer or free end of either of the bars $o^2$, one of its pawls is caused to mesh with the teeth of the corresponding rack, while by lowering the outer or free end of either bar the other pawl of the same is caused to engage with the teeth of the corresponding rack, and as one of the pawls of each bar is right handed and the other left handed, it follows that the elevation or depression of the bars $o^2$, will effect a reversal of the direction of motion of the carriages $f$ and $f'$, and consequently will cause the fashioning needles to be thrown into or out of action.

It may be remarked that retrograde movement of the carriages $f$ and $f'$, is prevented by means of dish-shaped washers $f^{13}$, Fig. 7, that engage the under side of the bed plate $a^2$. These washers are mounted upon spindles $f^{14}$, screwed or otherwise secured to the carriages $f$ and $f'$, and working in curved slots $a^{23}$ in the bed plate $a^2$.

$f^{15}$ and $f^{16}$, are thumb-nuts screwed onto the threaded extremities of the spindles $f^{14}$, and adapted to afford means for increasing or diminishing the tension or resiliency of the washers $f^{13}$.

The eccentric $l'$, on the shaft $j'$, is provided with a strap $l^2$, which is connected by a rod $l^3$, Fig. 31, to a crank arm $p$, on a rock-shaft $p'$, mounted in suitable bearings in the main frame. This rock-shaft $p'$, is provided with an arm $p^2$, Figs. 27 and 28, which carries two pawls. These pawls are guided by means of a stud $a^{24}$, projecting from the main-frame and are held up to their work by means of a spring $p^3$, connected with the frame work. The pawl $p^4$, engages continuously with a pattern chain feed wheel $p^6$, provided with a pattern chain drum $p^7$, and revolubly mounted upon a stud $a^{25}$, and held against retrograde movement by means of a dish-shaped spring washer $p^8$.

$p^9$, is a pattern-chain carried by the pattern chain drum $p^7$, and provided with sidewise projecting lugs $p^{10}$ and $p^{11}$, adapted to contact with a pin $p^{12}$, projecting from the inner face of a toothed cam carrying wheel $p^{13}$, revolubly mounted upon the stud $a^{25}$. This cam carrying wheel $p^{13}$, is driven by the pawl $p^{14}$, which however is adapted to work in a peripheral recess $p^{15}$, in order to permit the cam-wheel $p^{13}$, to remain at rest; it being understood that the pattern-chain $p^9$, serves to slightly rotate the cam-wheel $p^{13}$, in order to permit the same to be positively driven by the pawl $p^{14}$. By these means an intermittent motion is imparted to the cam-wheel $p^{13}$. The outer face of the cam-wheel $p^{13}$, is provided with three cams $p^{16}$, $p^{17}$, and $p^{18}$.

$p^{19}$ and $p^{20}$, are bars centrally pivoted to the frame-work of the machine, and having their outer extremities in engagement with carriers $o^9$, movably connected with the frame-work by means of pins $o^{10}$ and slots $o^{11}$. These carriers are provided with notches $o^{12}$, for the reception of the free extremities of the pawl bars $o^2$, and with springs $o^{13}$ (Fig. 28) engaging the latter and serving to keep the pawls $o$ and $o'$, up to their work. The inner extremities of the bars $p^{19}$ and $p^{20}$, are provided with curved cheeks $p^{21}$, that are acted upon one after another by the wedge-shaped extremity of the cam $p^{17}$, in order to lift the inner ends of the bars $p^{19}$ and $p^{20}$, and consequently to depress the pawl bars $o^2$, whereby the upper pawls $o'$ thereof are brought into engagement with the racks of the corresponding carriages and thus cause the fashioning needles to be thrown into action. The inner extremity of the bar $p^{19}$, is also provided with a finger $p^{22}$, extending into range of the top of the bar $p^{20}$, and with a lip $p^{23}$ adapted to pass over the cam $p^{17}$, and provided with an outwardly projecting pin $p^{24}$. The cam $p^{16}$, passes over the lip $p^{23}$, and is provided upon its inner face with an inclined groove (Fig. 29 and dotted line Fig. 27) adapted to engage the pin $p^{24}$, Fig. 27, and thus draw down the inner ends of the bars $p^{19}$ and $p^{20}$. This downward motion of the inner extremities of the bars $p^{19}$ and $p^{20}$, effects the lifting of the pawl bars $o^2$, thus bringing the lower pawls $o$, thereof into action and consequently causing the fashioning needles to be thrown out of action.

$p^{25}$, is a washer secured to the shaft $a^{25}$ and interposed between the hubs of the pattern chain drum $p^7$, and the cam wheel $p^{13}$, in order to prevent the movements of the former from being imparted by frictional contact to the latter. The outer extremity of the shaft $p'$, is provided with a double tappet, whereof one arm $p^{26}$, serves to effect the movement of the pulley $k$, into position for rotating the cam cylinder $b'$, and its accessories through the instrumentality of the pins $k^2$ and bar $l$, Figs. 20 and 21, and whereof the other arm $p^{27}$, serves first to shift the pulley $k$, into the position shown in Figs. 20 and 21, so that it may run loose on the shaft $j'$, thus permitting the machine to come to rest, and, second, to shift the pulley $k$, into position for oscillating the cam cylinder $b'$ and its accessories through the intervention of the drum $n^9$, pin $n^{13}$ and handle $j^3$.

$m^3$, Figs. 20 and 21, is a link having one of its extremities pivotally connected with the shipper rod $m'$, and having the other of its extremities similarly connected with one arm of a bell crank lever $m^4$, mounted upon a stud $a^{26}$, and held against accidental movement by means of a spiral spring $m^5$, and its complemental jam-nuts $m^6$.

$q$, is a bar connected at one extremity thereof with the other arm of the bell crank lever $m^4$, by means of a ball-and-socket joint $q'$. The free extremity of this arm $q$, is bifurcated and the upper arm $q^2$, of this bifurcation co-operates with the tappet-arm $p^{26}$, to effect the shifting of the pulley $k$, into position for rotating the cam cylinder $b'$. The lower arm $q^3$, of this bifurcation, is provided with two teeth whereof one $q^4$, co-operates with the tappet-arm $p^{27}$, to effect the adjustment of the pulley $k$ into position for effecting the oscillation of the cam-cylinder, and whereof the other $q^5$, co-operates with the same tappet-arm to effect the shifting of the pulley $k$, into idle position for permitting the machine to come to rest. The bar $q$, is connected with the rod $r$, by means of a slot $r'$ and pin $r^2$, so that the bar $q$, is afforded freedom of motion in the direction of its length, but may be shifted in a vertical plane by the elevation or depression of the rod $r$, in order to bring either the arm $q^2$, tooth $q^4$ or tooth $q^5$, as may be required, into range of the corresponding tappet-arm. This rod $r$, is provided with complemental cams $r^3$, for contacting with the roller $e^5$, and turning the same into position for causing the switch plate $e$, to throw the instep needles into or out of operation according as the rod $r$, is depressed or elevated. The upper extremity of the rod $r$, is connected with the thread clamping arm $i^2$, and serves to actuate the same.

$r^4$, Figs. 22, 28, 29 and 30, is an S-shaped lever pivotally connected with the main frame $a$, and having one extremity thereof connected with the rod $r$ by means of a connecting rod $r^5$.

$r^6$, is a spring connected with the bed-plate $a^2$, and lever $r^4$, and adapted to normally solicit the bar $r$, upward into position for bringing the tooth $q^4$, into range of the tappet-arm $p^{27}$, whereby the pulley $k$, is set in position for oscillating the cam-cylinder $b'$. The outer extremity of the S-shaped lever is provided with a shoulder $r^7$, Fig. 30, that lies parallel to the face of the cam-wheel $p^{13}$; it being understood that the axis of the lever and the axis of the cam-wheel are disposed at right angles to each other, so that the turning of the S-shaped lever in the direction of the arrow in Fig. 30, causes the shoulder $r^7$, to approach the face of the cam-wheel. The cam $p^{18}$, is provided at its extremity with a lip $r^8$, that affords a space as R, between it and the face of the cam-wheel. The upper edge of the lip $r^8$, contacts with the lower edge of the shoulder $r^7$, as shown in Fig. 30, and thus turns the lever about its fulcrum in an upward direction as indicated by the arrow in said figure, with the result that the shoulder $r^7$, is shifted toward the space R, and finally enters the same. The cam $p^{18}$, then passes over the shoulder $r^7$, and thus retains the lever in such position and as shown more particularly in Figs. 28 and 29. The upward movement of the lower end of the lever $r^4$, causes the upper end thereof and also the rod $r$, to be drawn down, so that the arm $q^2$, of the bar $q$, is brought into engagement with the tappet-arm $p^{26}$, whereby the pulley $k$, is shifted into position for rotating the cam cylinder $b'$.

$s$, is a shaft supported in bearings on the main-frame and provided at one extremity with an arm $s'$, disposed in range of a lug $s^2$, detachably connected by means of a set-screw $s^3$, with a seat $s^4$, carried by one of the links of the pattern chain $p^9$. The other extremity of the shaft $s$, is provided with an arm $s^5$, having an inwardly projecting lip $s^6$, adapted to contact with the portion $q^6$, of a plate $q^7$, depending from the arm $q$, in order to lift the latter into position for permitting the tooth $q^5$, to be engaged by the tappet arm $p^{27}$, in order to effect the movement of the pulley $k$ into its intermediate position, whereby the machine is permitted to come to rest. The lug $s^2$, by contacting with the arm $s'$, slightly rotates the shaft $s$, so that the arm $s^6$, is lifted off its back stop $s^7$.

$s^8$, is a spiral spring having one of its extremities connected with the main-frame $a$, and the other of its extremities connected with the arm $s^5$. When the arm $s^5$, is resting upon its back stop $s^7$, the spring $s^8$, occupies a position to the right of the center of the shaft $s$, and thus tends to hold the arm $s^5$, in such position. However, when the arm $s^5$, has been lifted from its back-stop $s^7$, by the lug $s^2$, and its accessories, the spring $s^8$, is shifted to the left hand side of the axis of the shaft $s$, and consequently turns the arm $s^5$, upward, thus permitting the lip $s^6$, to contact with the portion $q^6$, of the plate $q^7$, and to then engage a recess $q^3$, in the plate $q^7$, in order to secure the bar $q$, in such position that the pulley $k$, runs idly on the shaft $j'$, and the shipper rod $m'$, cannot be shifted manually or accidentally. In order to release the bar $q$, and shipper-rod $m'$, the arm $s^5$, must be turned out of engagement with the recess $q^8$, and into contact with its back stop $s^7$. This result may be effected by means of an operating handle $s^9$, on the arm $s^5$. However, it is not necessary or desirable that the operating handle $s^9$, should be afforded freedom of motion at all times. In fact for certain practical reasons which will be readily understood, said operating handle $s^9$, should be locked as soon as the arm $s^5$, is turned manually into contact with its back-stop $s^7$, and during the time that the movements of the working parts are being automatically controlled and governed in the manner above described, and should be released just prior to the turning of the shaft $s$, by the lug $s^2$, and its accessories.

A description will now be given of the mechanism whereby the shaft $s$, is automatically locked and released.

$t$, is a counter-balanced detent lever pivotally connected with the stud $a^{24}$, and provided with a recess $t'$, adapted for the reception of a pin $s^{10}$, projecting sidewise from the arm $s'$. This detent lever $t$, is normally turned by reason of its own weight into position for causing the recess $t'$, to engage with the pin $s^{10}$.

$t^2$, is a curved cheek formed upon the detent lever $t$, and disposed below the arm $s'$, and in range of the lug $s^2$, so that the latter contacts first with the cheek $t^2$, thus turning the detent lever $t$, and releasing pin $s^{10}$, and then with the arm $s'$, in order to effect the required movement of the shaft $s$, for shifting the arm $s^5$ thereof in the manner above described.

From the foregoing description it appears that the rod $r$, is availed of for operating the clamping arm $i^2$, of the thread controlling device. The slackener and take-up arm $i^3$, of said device, is operated by means of a rod $u$, Figs. 1, 20 and 21, having its lower extremity pivotally attached to a set-screw $u'$, adjustably mounted in a slot $u^2$, in one arm $u^3$, of a bell crank lever pivotally attached to the main frame $a$. The other arm $u^4$, of this bell-crank lever is acted upon by tappet-arms $m^7$, carried by the link $m^3$, whenever the latter is shifted in order to operate the shipper rod $m'$.

$u^5$, Fig. 20, is a set-screw connected with the pedestal $a'$, and disposed in range of the arm $u^3$, in order to limit the range of upward movement of the take-up arm $i^3$.

For the sake of a further explanation of my invention, a description will now be given of the mode of operation of the above described machine in producing a stocking or sock.

The stitches of a so-called top are run onto the quills or dents of a transfer frame either manually or in any preferred manner. The transfer-frame is then mounted upon the posts $g^{16}$, in such manner that it is free to slide thereon and in such manner that each quill or dent engages a needle. During this operation the switch plate $e$, is turned into position for engaging the long bits of the instep needles and lifting them out of action. The cam-cylinder $b'$, is then turned manually one half revolution by means of the handle $j^3$. This motion of the cam-cylinder $b'$, causes the switch-plate $e$, to lift up the long bitted instep needles, and the part of the needle-cam opposite the operative portion thereof shown at Fig. 18, serves to elevate the fashioning and heel needles, but not to the level of the long bitted instep needles, so that all the needles of the machine are lifted up into engagement with the corresponding dents or quills of the transfer-frame. The top is then drawn manually down through the needle-cylinder with the result that the stitches thereof are transferred from the quills to the needles. The switch-plate $e$, is then turned manually into position for throwing the instep needles into action and the cam-cylinder $b'$, is rotated manually one half of a revolution in a reverse direction with the result that all the needles of the machine are again brought into action. The arm $s^5$, is turned manually downward out of engagement with the bar $q$, as shown in Fig. 22, whereupon the free end of the shipper $m'$, is turned manually toward the right in Fig. 21, with the result that the pulley $k$, is thrown into engagement with the eccentric $l'$, and consequently into position for rotating the cam-cylinder $b'$. It must be borne in mind that the lower end $r^7$, of the S shaped lever $r^4$, is locked by the cam $p^{18}$, in elevated position and that the rod $r$, is locked in depressed position. Consequently the above-mentioned movement of the shipper $m'$, causes the bar $q$, to be moved in the direction of its length toward the left in Fig. 22, with the result that the arm $q^3$, comes into range of the tappet arm $p^{26}$, which latter tends to maintain the pulley $k$, in position for effecting the revolution of the cam cylinder $b'$. By reason of the fact that the rod $r$, is in depressed position the thread clamping arm $i^2$, is pressed firmly upon its seat and consequently prevents the feed of the extra thread. Under these circumstances the cam cylinder $b'$, and its accessories, are rotated and thus a tubular web or leg portion is knit onto the "top." When the required length of leg has been knit, the pin $p^{10}$, of the pattern-chain contacts with the pin $p^{12}$, on the cam wheel $p^{13}$, and thus rotates the latter sufficiently to permit the pawl $p^{14}$, to pass out of the recess $p^{15}$, and come into action, and to rotate the cam-wheel $p^{13}$. This movement of the cam-wheel causes the cam $p^{18}$, to release the lever $r^4$, and the cam $p^{16}$, to engage the pin $p^{24}$. As soon as the lever $r^4$, is released, the spring $r^6$, draws the rod $r$, and its accessories, upward into position for lifting the thread clamping arm $i^2$, and for turning the switch plate $e$, into operative position. The upward movement of the rod $r$, also lifts the bar $q$, into position for bringing the tooth $q^4$, thereof into range of the tappet-arm $p^{27}$. The tappet-arm $p^{27}$, engages said tooth and thus shifts the bar $q$, link $m^3$ and shipper $m'$. This movement of the bar $q$, link $m^3$ and shipper $m'$, is productive of a twofold result:—first, the slackener and take-up arm $i^3$, and its complemental take-up spring $i^4$, are turned upward into operative position, and, second, the pulley $k$, is brought into position for reciprocating the cam cylinder $b'$, and its accessories, through the intervention of the counter-shaft $n^2$, and its complemental gearing. The counter-shaft $n^2$, acting through the lever $o^4$, causes the pawl bars $o^2$, to be reciprocated, and the cam $p^{16}$ acting through the bars $p^{19}$ and $p^{20}$, causes the pawl bars $o^2$, to be lifted into position for permitting the pawls $o$, to intermittently drive the cam-carriages $f$ and $f'$, toward the top of Fig. 16, and into the position illustrated in Fig. 23, and thus effect the throwing of the fashioning needles out of action. It may be remarked that the pawl bars $o^2$, remain in elevated position by reason of the frictional resistance existing between the bars $p^{19}$ and $p^{20}$, and frame-work of the machine. Under these circumstances the cam cylinder $b'$, is reciprocated, the extra thread is incorporated in the fabric, and the fashioning needles are thrown out of action, so that the flatweb of the heel is knit and narrowed. The pawl $p^{14}$, continues to rotate the cam-wheel $p^{13}$, so that the cam $p^{17}$, is caused to engage the cheeks $p^{21}$, and lift the inner ends of the bars $p^{19}$ and $p^{20}$, thus causing the pawl bars $o^2$, to be depressed. The depression of the pawl bars $o^2$, brings the pawls $o'$, into position for effecting an intermittent reverse movement of the cam carriages $f$ and $f'$, in order to permit the fashioning needles again to come into action and widen the web. The continued revolution of the cam-wheel $p^{13}$, brings the cam $p^{18}$, again into engagement with the lever $r^4$, whereby the parts of the machine are caused to knit the foot portion of the stocking or sock in precisely the same manner that they knit the leg portion. Upon the completion of the foot portion, the pin $p^{11}$, brings the cam-wheel $p^{13}$ again under the influence of the pawl $p^{14}$ and the motion of the cam-wheel acting through the instrumentality of the cams $p^{16}$ and $p^{17}$, effects the requisite narrowing and widening of the toe portion of the stocking in precisely the manner hereinabove described in respect to the heel portion thereof. Upon the completion of the toe the cam $p^{18}$, again engages the lever $r^4$ and the pawl $p^{14}$, works in the recess $p^{15}$. Under these conditions a tube is knit onto the toe portion of the stocking. This tube facilitates the operation of looping up the toe and is unraveled after the looping operation is completed. During the fabrication of the stocking the arm $s^5$, was locked to place against its back-stop $s^7$, and in inoperative position by means of the counterbalanced detent $t$, and its complemental pin $s^{10}$. This is important because it prevents the attendant-in-charge from accidentally or otherwise stopping the machine while the stocking is incomplete and manually shifting certain parts thereof whereby the automatic devices might be thrown out of time in respect to each other, consequently causing the production of imperfect work. However, upon the completion of the required length of tubular web at the toe portion of the stocking, the lug $s^2$, contacts with the counterbalanced detent lever $t$, to release the shaft $s$, and then with the arm $s'$, to slightly rotate the shaft $s$ and permit the spring $s^8$, to bring the lip $s^6$ in engagement with the plate $q^7$, whereby the machine is stopped and locked in such position in the manner hereinabove described. The stocking may then be run off the needles of the machine and the toe portion looped up and unraveled. The repetition of the above described operations results in the production of other stockings.

Having thus described the nature and objects of my invention, what I claim as new, and desire to secure by Letters Patent, is—

1. A knitting machine provided with a driving-shaft, a counter-shaft, a driving pulley, mechanism for imparting rotary motion from the pulley to the counter-shaft, an arm and its accessories actuated by the counter-shaft and adapted to reciprocate the driving shaft, and pawl-and-ratchet devices for preventing retrograde movement of the counter-shaft, substantially as and for the purposes set forth.

2. A knitting machine provided with a driving-shaft, a counter-shaft having a crank, a reciprocating rod actuated by said crank and provided with connections for oscillating the driving shaft, a tooth on said counter-shaft, and a detent for engaging said tooth, substantially as and for the purposes set forth.

3. A knitting machine provided with a counter-shaft, a pivotal bar having its extremities connected with pawl bars, a centrally pivoted lever having one extremity in engagement with the pivotal bar, and a cam on the counter-shaft engaging the other extremity of the lever, substantially as and for the purposes set forth.

4. A knitting machine provided with a counter-shaft, a pivotal bar having its respective extremities connected with pawl bars, a centrally pivoted lever having one extremity in engagement with the pivotal bar, a cam on the counter-shaft engaging the other extremity of the lever, and set-screws for limiting the range of motion of the pivotal bar, substantially as and for the purposes set forth.

5. A knitting machine provided with a pivotal bar having its extremities connected with pawl-bars, a centrally pivoted lever having one extremity thereof in engagement with the pivotal bar, a counter-shaft and segmental plates adjustably connected with the counter-shaft and provided with cams for engaging the other extremity of said lever, substantially as and for the purposes set forth.

6. A knitting machine provided with a pivotal bar having its extremities connected with pawl-bars, a centrally pivoted lever having one extremity thereof in engagement with the pivotal bar, a counter-shaft, segmental plates adjustably connected with the counter-shaft and provided with cams for engaging the other extremity of said lever, and set-screws for limiting the range of motion of the pivotal bar, substantially as and for the purposes set forth.

7. A knitting machine provided with a pivotal bar having its extremities connected with pawl bars, a centrally pivoted lever having one extremity thereof in engagement with the pivotal bar, a counter-shaft, a sleeve keyed to the counter-shaft, and segmental plates adjustably connected with the sleeve and provided with cams for engaging the other extremity of said lever, substantially as and for the purposes set forth.

8. A knitting machine provided with a driving shaft having a crank-arm, a driving drum loose on the driving shaft and provided with a recess, a spring controlled pin carried by the handle, and adapted to engage said recess, and means for shifting the drum, substantially as and for the purposes set forth.

9. A knitting machine provided with a driving shaft having a crank-arm, a driving drum loose on the driving shaft and provided with a recess and its complemental cam surface, a spring controlled pin carried by the handle and adapted to ride on the cam surface and snap into the recess, and means for shifting the drum, substantially as and for the purposes set forth.

10. The combination, in a knitting-machine of a driving shaft geared to the cam-cylinder, stop motion mechanism, an eccentric fast on said shaft and adapted to supply power to the stop motion mechanism, a bar on the hub of the eccentric, a pulley afforded end play on the shaft and provided with spring controlled pins for engaging said bar and means for shifting said pulley, substantially as and for the purposes set forth.

11. A knitting machine provided with a sinker bed, sinker-bars working in said bed, a revoluble sinker-cam, a washer interposed between the sinker-cam and bars, and means for actuating the sinker-cam, substantially as and for the purposes set forth.

12. A knitting machine provided with a thread carrier, needles, needle-cams, sinker-bars adapted to pass under the thread after it is laid onto the needles and having inclined edges for drawing the thread upward to expand the stitches, and means for operating the sinker-bars, needle-cams and thread carrier, substantially as and for the purposes set forth.

13. In a knitting machine, needles and sinker-bars having inclined working edges adapted to co-operate with the needles in expanding the stitches, substantially as and for the purposes set forth.

14. A knitting machine provided with latch needles, a revoluble sinker-cam having a downwardly projecting ear adapted to ride over and open the latches of the needles, and means for actuating the needles and sinker-cam, substantially as and for the purposes set forth.

15. A knitting machine provided with a needle cylinder, a split-ring provided with a downwardly projecting finger, a wedge for clamping said ring in the cylinder, and a bed having means for supporting said finger, substantially as and for the purposes set forth.

16. A knitting machine provided with a needle cylinder, a split-ring provided with a downwardly projecting finger and with recessed extremities, a wedge adapted for insertion in said recesses to clamp the ring in the needle cylinder, and a bed having means for supporting said finger, substantially as and for the purposes set forth.

17. A knitting machine provided with an axially grooved needle cylinder, needles working in said grooves and provided with bits, a sinker bed fitted on wide portions of the webs between said grooves, a sectional ring detachably fitted into notches in said webs beneath the wide portions thereof and adapted to serve as a gage for the sinker-bed and to permit of the removal of needles, substantially as and for the purposes set forth.

18. A knitting machine provided with needles, a thread carrier and a complete ring adapted to open the latches of the needles and adjustably connected with the pivotal portion of the thread carrier, the construction being such that the ring may be turned clear of the needles to permit of the application of a transfer-frame, substantially as and for the purposes set forth.

19. A knitting machine provided with needles, a post connected with the cam cylinder, a thread carrying arm hinged to said post, a ring adapted to open the latches of the needles and adjustably attached to said hinged arm, and an adjusting screw interposed between the post and arm, substantially as and for the purposes set forth.

20. A knitting machine provided with needles, a post connected with the cam cylinder, a thread carrying arm hinged to said post, and a complete ring adjustably connected with the hinged arm and provided with an integral plate having its lower edge adapted to open the latches of the needles, substantially as and for the purposes set forth.

21. A knitting machine provided with fashioning needle controlling cam carriages, pawls for actuating said carriages, and racks detachably connected with said carriages, substantially as and for the purposes set forth.

22. A knitting machine provided with fashioning needle controlling cam carriages, racks provided with slots, set-screws working in said slots and connected with the cam carriages, and pawls engaging said racks, substantially as and for the purposes set forth.

23. A knitting machine provided with knitting cams, a set of fashioning needles movable out of range of the knitting cams, carriages provided with a recess closed at the bottom and having a seat for the fashioning needles, and cam-plates applied to the edges of said recess and forming two openings whereof each is co-extensive with the set of fashioning needles and said plates operating upon both sides of the shanks of all the needles of the set, substantially as and for the purposes set forth.

24. A knitting machine provided with knitting cams, sets of fashioning needles movable out of range of the knitting cams, a carriage appertaining to each set of fashioning needles and provided with cam plates extending beyond one end of each of the carriages, the projecting extremities of the cam-plates of one carriage being off-set for the accommodation of the cam plates of the other carriage, substantially as and for the purposes set forth.

25. A knitting machine provided with a needle cylinder having a retaining spring, needles some of which have longer bits than others and curved shanks for engaging said spring, a pivotal switch plate adapted to engage the long bits and shift the corresponding needles out of and into engagement with said spring, a rock-shaft carrying said switch-plate, a pin or projection on said rock-shaft, and a spring acting upon said pin or projection and serving to retain it in its extreme positions, substantially as and for the purposes set forth.

26. A knitting machine provided with a needle cylinder having axial grooves at the top thereof and having a less number of axial grooves at the bottom thereof, needles working in the top grooves and connected in pairs with jacks working in the bottom grooves, and means for operating the jacks, substantially as and for the purposes set forth.

27. A knitting machine provided with a needle cylinder, a pair of needles having bent shanks adapted to interlock with each other, a jack provided with a recess for engaging the interlocked shanks, and means for operating the jack, substantially as and for the purposes set forth.

28. A knitting machine provided with needles connected with a jack, and a needle cylinder having axial grooves at the top for the reception of the needles, axial grooves at the bottom for the reception of the jacks, and a peripheral groove for the accommodation of the couplings of the jacks and needles, substantially as and for the purposes set forth.

29. A knitting machine provided with fashioning needles and their complemental cam carriages, a vibrating lever, pawl bars, ball-and-socket connections between the bars and lever, and means for elevating and depressing the pawl bars and for affording the same a range of sidewise motion, substantially as and for the purposes set forth.

30. A knitting machine provided with a main shaft, a drum movable endwise on said shaft, a counter-shaft provided with a crank, a reciprocating rod connected with said drum by straps, and a ball-and-socket joint interposed between the crank and rod to accommodate the endwise movement of the drum, substantially as and for the purposes set forth.

31. A knitting machine provided with a driving pulley and its complemental shipper, a rod and a bell crank for actuating the shipper, a continuously operated shaft having two tappet-arms, a bar adapted to be shifted endwise by said tappet-arms, means for lifting and depressing said bar, and a ball-and-socket joint interposed between the bell-crank and bar, substantially as and for the purposes set forth.

32. A knitting machine provided with a driving pulley and its complemental shipper mechanism, an oscillating shaft provided with tappet-arms, a bar co-operating with the tappet-arms and connected with the shipper mechanism, a pattern chain provided with a projection, a shaft provided with a spring controlled arm for locking said bar and with an arm disposed in range of said projection, substantially as and for the purposes set forth.

33. A knitting machine provided with a driving pulley and its complemental shipper-mechanism, an oscillating shaft provided with tappet-arms, a bar co-operating with the tappet arms and connected with the shipper mechanism, a pattern-chain provided with a projection, a plate depending from said bar and provided with a recess, a spring controlled shaft provided with an arm having a lip for engaging said recess and with an arm disposed in range of said projection, substantially as and for the purposes set forth.

34. A knitting machine provided with a driving pulley and its complemental shipper mechanism, an oscillating shaft having tappet-arms, a bar co-operating with the tappet-arms and connected with the shipper mechanism, a pattern-chain provided with a projection, a shaft provided with an arm adapted to lock said bar, a back-stop for said arm, a spring tending to draw said arm into engagement with its seat and with said bar, and a second arm on said shaft disposed in range of said projection, substantially as and for the purposes set forth.

35. A knitting machine provided with a driving pulley and its complemental shipper mechanism, an oscillating shaft provided with tappet-arms, a bar co-operating with the tappet-arms and connected with the shipper mechanism, a pattern-chain, a shaft provided with an arm for engaging said bar, a lever for locking a second arm on said shaft, and a projection on the pattern chain adapted to release said lever and operate the last mentioned arm, substantially as and for the purposes set forth.

36. A knitting machine provided with a driving pulley and its complemental shipper mechanism, an oscillating shaft provided with tappet-arms, a bar co-operating with the tappet-arms and connected with the shipper mechanism, a pattern chain, a plate depending from said bar and provided with a recess, a shaft provided with an arm having a lip for engaging said bar, a second arm on said shaft, a lever for locking the last mentioned arm, and a lug on the pattern chain for releasing the lever and operating the shaft, substantially as and for the purposes set forth.

37. A knitting machine provided with stop motion mechanism having a bar and its complemental tappet-arms and pattern chain, a shaft having an arm, a back-stop, a spring for soliciting said arm into engagement with the bar or back-stop, a second arm on said shaft, a lever normally locking the last mentioned arm, and a lug on the pattern-chain for releasing said lever and operating the shaft, substantially as and for the purposes set forth.

38. A knitting machine provided with stop motion mechanism comprising a pattern-chain, an arm, a lug on the chain, and a lever normally locking said arm and disposed in range of said lug, substantially as and for the purposes set forth.

39. A knitting machine provided with reversing mechanism having tappet-arms, a bar co-operating with the tappet-arms and adapted to operate the link connected with the belt shipper of said mechanism, a bell-crank operated by said link, a thread controlling device provided with take-up and clamping-arms, connections between the take-up arm and bell-crank, a rod attached to the clamping arm and provided with a pin working in a slot in the bar, a pivotal lever having one extremity attached to said rod, and a wheel provided with a cam in range of the other extremity of the pivotal lever, substantially as and for the purposes set forth.

40. A knitting-machine provided with a thread controlling-device having clamping and take-up arms, automatic reversing mechanism having tappet-arms and a link and bar connected by a bell-crank, a rod connected with the clamping-arm and bar, a second bell-crank provided with a rod connected with the take-up arm, and a slotted-plate engaging the last mentioned bell-crank and carried by said link, substantially as and for the purposes set forth.

41. A knitting machine provided with a thread controlling device having a take-up arm, reversing mechanism having a link, a bell-crank lever, a rod connected with one arm of the bell-crank lever and with the take-up arm, a slotted plate engaging the other arm of the bell crank lever and carried by said link, and an adjustable back-stop for the bell-crank lever, substantially as and for the purposes set forth.

42. A knitting machine provided with a thread controlling device having a clamping arm, reversing mechanism having a bar and tappet-arms, a rod connected with said bar and arm, a lever and connections for operating said rod, a cam-wheel for controlling said lever and means, substantially as described, for intermittently rotating said cam-wheel, substantially as and for the purposes set forth.

In testimony whereof I have hereunto set my signature in the presence of two subscribing witnesses.

EMIL J. FRANCK.

Witnesses:
THOMAS M. SMITH,
RICHARD C. MAXWELL.